US009755984B1

(12) United States Patent
Feroz et al.

(10) Patent No.: US 9,755,984 B1
(45) Date of Patent: *Sep. 5, 2017

(54) AGGREGATE NETWORK RESOURCE UTILIZATION CONTROL SCHEME

(75) Inventors: Azeem Feroz, Cupertino, CA (US); Wei-Lung Lai, Cupertino, CA (US); Roopesh R. Varier, Sunnyvale, CA (US); James J. Stabile, Los Altos, CA (US); Jon Eric Okholm, Monte Sereno, CA (US)

(73) Assignee: SYMANTEC CORPORATION, Mountain View, CA (US)

( * ) Notice: Subject to any disclaimer, the term of this patent is extended or adjusted under 35 U.S.C. 154(b) by 540 days.

This patent is subject to a terminal disclaimer.

(21) Appl. No.: 12/250,684

(22) Filed: Oct. 14, 2008

Related U.S. Application Data

(63) Continuation of application No. 11/053,596, filed on Feb. 8, 2005, now Pat. No. 7,453,804.

(51) Int. Cl.
*H04L 12/873* (2013.01)
*H04L 12/863* (2013.01)

(52) U.S. Cl.
CPC .......... *H04L 47/522* (2013.01); *H04L 47/623* (2013.01)

(58) Field of Classification Search
None
See application file for complete search history.

(56) References Cited

U.S. PATENT DOCUMENTS

| | | | |
|---|---|---|---|
| 6,046,980 A * | 4/2000 | Packer | 370/230 |
| 6,072,772 A * | 6/2000 | Charny et al. | 370/229 |
| 6,256,315 B1 * | 7/2001 | Barbas et al. | 370/412 |
| 6,438,134 B1 * | 8/2002 | Chow | H04L 12/5602 370/230 |
| 6,519,595 B1 * | 2/2003 | Rose | H04L 12/5695 370/398 |
| 6,687,220 B1 * | 2/2004 | Ayres | H04L 12/5693 370/229 |
| 7,010,611 B1 | 3/2006 | Wiryaman et al. | 709/232 |
| 7,236,491 B2 * | 6/2007 | Tsao et al. | 370/392 |
| 2001/0024452 A1 * | 9/2001 | Liu et al. | 370/468 |
| 2002/0006111 A1 * | 1/2002 | Akita et al. | 370/235 |
| 2002/0141425 A1 * | 10/2002 | Merani et al. | 370/412 |
| 2003/0061263 A1 | 3/2003 | Riddle | 709/104 |
| 2003/0202467 A1 * | 10/2003 | Bruckman et al. | 370/229 |
| 2004/0057462 A1 * | 3/2004 | Lim et al. | 370/468 |

(Continued)

*Primary Examiner* — Faruk Hamza
*Assistant Examiner* — Thinh Tran
(74) *Attorney, Agent, or Firm* — Maschoff Brennan

(57) ABSTRACT

Methods, apparatuses and systems directed to an aggregate bandwidth utilization control scheme including fair share bandwidth allocation and dynamic allocation of bandwidth in response to detected traffic utilization. In one implementation, the present invention includes a weighted, fair share aggregate bandwidth allocation mechanism that dynamically responds to observed bandwidth utilization to provide unutilized or excess bandwidth to flows and partitions that require it. In another implementation, the present invention features a weighted fair share allocation scheme for hierarchical partition configurations. In other implementations, the present invention provides a per-flow target rate assignment mechanism that prevents spiraling decline of data flow rates.

9 Claims, 12 Drawing Sheets

(56) References Cited

U.S. PATENT DOCUMENTS

2004/0213264 A1* 10/2004 Mistry ................. C07D 243/14
                                                                                       370/395.7
2005/0175014 A1* 8/2005 Patrick ..................... 370/395.43
2005/0249220 A1* 11/2005 Olsen et al. ............... 370/395.4

* cited by examiner

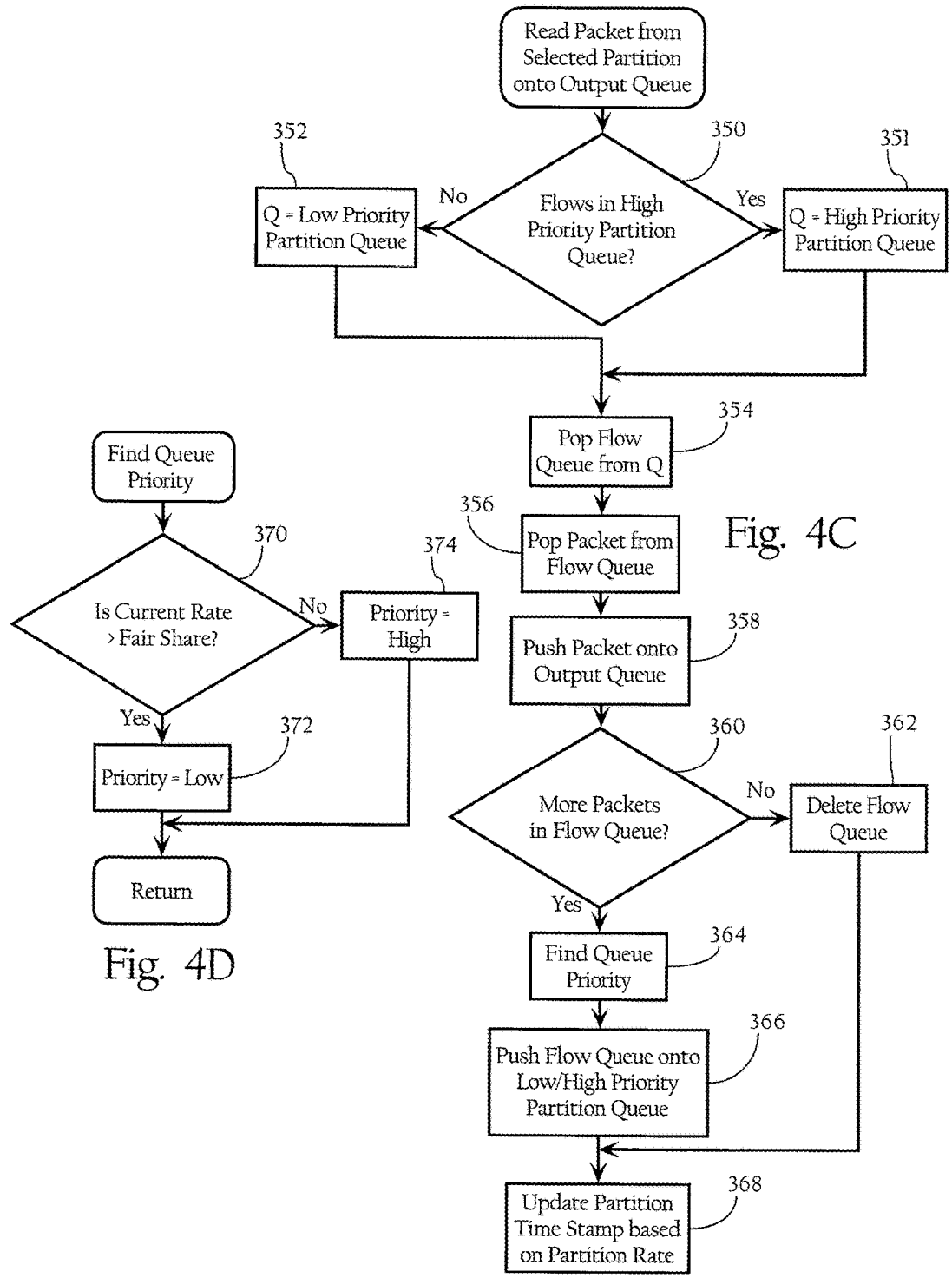

US 9,755,984 B1

AGGREGATE NETWORK RESOURCE UTILIZATION CONTROL SCHEME

CROSS-REFERENCE TO RELATED APPLICATIONS

This application is a continuation of U.S. application Ser. No. 11/053,596 filed Feb. 8, 2005 entitled "Aggregate Network Resource Utilization Control Scheme."

This application makes reference to the following commonly owned U.S. patent applications and patents, which are incorporated herein by reference in their entirety for all purposes:

U.S. patent application Ser. No. 08/762,828 now U.S. Pat. No. 5,802,106 in the name of Robert L. Packer, entitled "Method for Rapid Data Rate Detection in a Packet Communication Environment Without Data Rate Supervision;"

U.S. patent application Ser. No. 08/970,693 now U.S. Pat. No. 6,018,516, in the name of Robert L. Packer, entitled "Method for Minimizing Unneeded Retransmission of Packets in a Packet Communication Environment Supporting a Plurality of Data Link Rates;"

U.S. patent application Ser. No. 08/742,994 now U.S. Pat. No. 6,038,216, in the name of Robert L. Packer, entitled "Method for Explicit Data Rate Control in a Packet Communication Environment without Data Rate Supervision;"

U.S. patent application Ser. No. 09/977,642 now U.S. Pat. No. 6,046,980, in the name of Robert L. Packer, entitled "System for Managing Flow Bandwidth Utilization at Network, Transport and Application Layers in Store and Forward Network;"

U.S. patent application Ser. No. 09/106,924 now U.S. Pat. No. 6,115,357, in the name of Robert L. Packer and Brett D. Galloway, entitled "Method for Pacing Data Flow in a Packet-based Network;"

U.S. patent application Ser. No. 09/046,776 now U.S. Pat. No. 6,205,120, in the name of Robert L. Packer and Guy Riddle, entitled "Method for Transparently Determining and Setting an Optimal Minimum Required TCP Window Size;"

U.S. patent application Ser. No. 09/479,356 now U.S. Pat. No. 6,285,658, in the name of Robert L. Packer, entitled "System for Managing Flow Bandwidth Utilization at Network, Transport and Application Layers in Store and Forward Network;"

U.S. patent application Ser. No. 09/198,090 now U.S. Pat. No. 6,412,000, in the name of Guy Riddle and Robert L. Packer, entitled "Method for Automatically Classifying Traffic in a Packet Communications Network;"

U.S. patent application Ser. No. 09/198,051, in the name of Guy Riddle, entitled "Method for Automatically Determining a Traffic Policy in a Packet Communications Network;"

U.S. patent application Ser. No. 09/206,772, now U.S. Pat. No. 6,456,360, in the name of Robert L. Packer, Brett D. Galloway and Ted Thi, entitled "Method for Data Rate Control for Heterogeneous or Peer Internetworking;"

U.S. patent application Ser. No. 09/710,442, in the name of Todd Krautkremer and Guy Riddle, entitled "Application Service Level Mediation and Method of Using the Same;"

U.S. patent application Ser. No. 09/966,538, in the name of Guy Riddle, entitled "Dynamic Partitioning of Network Resources;"

U.S. patent application Ser. No. 10/015,826 in the name of Guy Riddle, entitled "Dynamic Tunnel Probing in a Communications Network;"

U.S. patent application Ser. No. 10/039,992, in the name of Michael J. Quinn and Mary L. Laier, entitled "Method and Apparatus for Fast Lookup of Related Classification Entities in a Tree-Ordered Classification Hierarchy;"

U.S. patent application Ser. No. 10/108,085, in the name of Wei-Lung Lai, Jon Eric Okholm, and Michael J. Quinn, entitled "Output Scheduling Data Structure Facilitating Hierarchical Network Resource Allocation Scheme;"

U.S. patent application Ser. No. 10/178,617, in the name of Robert E. Purvy, entitled "Methods, Apparatuses and Systems Facilitating Analysis of Network Device Performance;"

U.S. patent application Ser. No. 10/155,936 now U.S. Pat. No. 6,591,299, in the name of Guy Riddle, Robert L. Packer, and Mark Hill, entitled "Method For Automatically Classifying Traffic With Enhanced Hierarchy In A Packet Communications Network;"

U.S. patent application Ser. No. 10/236,149, in the name of Brett Galloway and George Powers, entitled "Classification Data Structure enabling Multi-Dimensional Network Traffic Classification and Control Schemes;"

U.S. patent application Ser. No. 10/334,467, in the name of Mark Hill, entitled "Methods, Apparatuses and Systems Facilitating Analysis of the Performance of Network Traffic Classification Configurations;"

U.S. patent application Ser. No. 10/453,345, in the name of Scott Hankins, Michael R. Morford, and Michael J. Quinn, entitled "Flow-Based Packet Capture;"

U.S. patent application Ser. No. 10/676,383 in the name of Guy Riddle, entitled "Enhanced Flow Data Records Including Traffic Type Data;"

U.S. patent application Ser. No. 10/720,329, in the name of Weng-Chin Yung, Mark Hill and Anne Cesa Klein, entitled "Heuristic Behavior Pattern Matching of Data Flows in Enhanced Network Traffic Classification;"

U.S. patent application Ser. No. 10/812,198 in the name of Michael Robert Morford and Robert E. Purvy, entitled "Adaptive, Application-Aware Selection of Differentiated Network Services;"

U.S. patent application Ser. No. 10/843,185 in the name of Guy Riddle, Curtis Vance Bradford and Maddie Cheng, entitled "Packet Load Shedding;"

U.S. patent application Ser. No. 10/938,435 in the name of Guy Riddle, entitled "Classification and Management of Network Traffic Based on Attributes Orthogonal to Explicit Packet Attributes;" and U.S. patent application Ser. No. 11/027,744 in the name of Mark Urban, entitled "Adaptive Correlation of Service Level Agreement and Network Application Performance."

FIELD OF THE INVENTION

The present invention relates to management of network resources and, more particularly, to methods, apparatuses and systems directed to an aggregate network resource utilization control mechanism.

BACKGROUND OF THE INVENTION

Enterprises have become increasingly dependent on computer network infrastructures to provide services and accomplish mission-critical tasks. Indeed, the performance, security, and efficiency of these network infrastructures have become critical as enterprises increase their reliance on distributed computing environments and wide area computer networks. To that end, a variety of network devices have been created to provide data gathering, reporting, and/or operational functions, such as firewalls, gateways, packet capture devices, bandwidth management devices, application traffic monitoring devices, and the like. For example, the TCP/IP protocol suite, which is widely implemented throughout the world-wide data communications network environment called the Internet and many wide and local area networks, omits any explicit supervisory function over the rate of data transport over the various devices that comprise the network. While there are certain perceived advantages, this characteristic has the consequence of juxtaposing very high-speed packets and very low-speed packets in potential conflict and produces certain inefficiencies. Certain loading conditions degrade performance of networked applications and can even cause instabilities which could lead to overloads that could stop data transfer temporarily.

To facilitate monitoring, management and control of network environments, a variety of network devices, applications, technologies and services have been developed. For example, certain data flow rate control mechanisms have been developed to provide a means to control and optimize efficiency of data transfer as well as allocate available bandwidth among a variety of business enterprise functionalities. For example, U.S. Pat. No. 6,038,216 discloses a method for explicit data rate control in a packet-based network environment without data rate supervision. Data rate control directly moderates the rate of data transmission from a sending host, resulting in just-in-time data transmission to control inbound traffic and buffering of packets, and reduce the inefficiencies associated with dropped packets. Bandwidth management devices also allow for explicit data rate control for flows associated with a particular traffic classification. For example, U.S. Pat. No. 6,412,000, above, discloses automatic classification of network traffic for use in connection with bandwidth allocation mechanisms. U.S. Pat. No. 6,046,980 discloses systems and methods allowing for application layer control of bandwidth utilization in packet-based computer networks. For example, bandwidth management devices allow network administrators to specify policies operative to control and/or prioritize the bandwidth allocated to individual data flows according to traffic classifications. In addition, certain bandwidth management devices, as well as certain routers, allow network administrators to specify aggregate bandwidth utilization controls to divide available bandwidth into partitions. With some network devices, these partitions can be configured to provide a minimum bandwidth guarantee, and/or cap bandwidth, as to a particular class of traffic. An administrator specifies a traffic class (such as FTP data, or data flows involving a specific user or network application) and the size of the reserved virtual link—i.e., minimum guaranteed bandwidth and/or maximum bandwidth. Such partitions can be applied on a per-application basis (protecting and/or capping bandwidth for all traffic associated with an application) or a per-user basis (controlling, prioritizing, protecting and/or capping bandwidth for a particular user). In addition, certain bandwidth management devices allow administrators to define a partition hierarchy by configuring one or more partitions dividing the access link and further dividing the parent partitions into one or more child partitions. U.S. patent application Ser. No. 10/108,085 discloses data structures and methods for implementing a partition hierarchy.

Certain application traffic management devices, such as the PacketShaper® application traffic management device, offered by Packeteer®, Inc. of Cupertino, Calif., support the concurrent use of aggregate bandwidth policies (e.g., partitions), and per-flow bandwidth policies, such as rate policies enforced by the TCP Rate control technologies disclosed in U.S. Pat. No. 6,038,216. A partition is essentially a bandwidth allocation and queuing mechanism. That is, after a packet processor classifies each packet and pushes each packet onto a partition queue associated with the appropriate partition, another process, typically, loops through the partition queues to pop packets off the queues and populate an output queue. Aggregate bandwidth allocation among the different partitions essentially establishes a preference by which a flow control mechanism arbitrates among the corresponding partition queues. For example, a flow control module, while arbitrating among the partition queues, may read more packets from partitions having a higher allocation of bandwidth relative to partitions that have lower allocations. For example, as disclosed in U.S. application Ser. No. 10/108,085, incorporated by reference above, the bandwidth allocated to a given partition affects the rate at which the partition is selected by an output scheduling process and therefore the length of time packets are buffered in the corresponding partition queue. In addition, TCP Rate Control technologies can be used to effect per-flow rate policies to control or influence the rate at which packets are received at a network device and, therefore, use of inbound network bandwidth and the amount of data that is queued at any given time.

While partitions and per-flow rate policies are effective for their intended purposes, the configuration parameters that lead to their effective and predictable concurrent operation is often beyond the skill level of the average end user. For example, effective configuration of per-flow rate policies within a partition often requires a general knowledge of the typical number of data flows falling within the partition at given times. For example, a per-flow target rate is generally allocated based on an estimated rate demand for a given flow, regardless of the configuration of the partition that controls the flows in the aggregate. This per-flow target rate may be limited or adjusted by a per-flow rate policy configured by a user. In either case, these circumstances can result in significant underutilization of available bandwidth if the data flows do not actually consume their allocated rate, resulting in underutilization of the bandwidth allocated to the partition and the access link itself. Furthermore, use of explicit per-flow rate policies as the primary means of allocating per-flow bandwidth may not achieve a fair distribution of this bandwidth across the active flows in the partition.

In light of the foregoing, a need in the art exists for methods, apparatuses and systems directed to bandwidth control mechanism that addresses the problems discussed above. Embodiments of the present invention substantially fulfill this need.

SUMMARY OF THE INVENTION

The present invention provides methods, apparatuses and systems directed to an aggregate bandwidth utilization control scheme including fair share bandwidth allocation and dynamic allocation of bandwidth in response to detected traffic utilization. In one implementation, the present invention includes a weighted, fair share aggregate bandwidth allocation mechanism that dynamically responds to observed bandwidth utilization to provide unutilized or excess bandwidth to flows and partitions that require it. In another implementation, the present invention features a weighted fair share allocation scheme for hierarchical partition configurations. In other implementations, the present invention provides a per-flow target rate assignment mechanism that prevents spiraling decline of data flow rates. These

DESCRIPTION OF THE DRAWINGS

FIG. 4C is a flow chart diagram providing a method involving scheduling a packet for output from an application traffic management device.

FIG. 4D is a flow chart diagram illustrating the decisional logic associated with placing a flow queue onto a high priority or low priority partition queue.

DESCRIPTION OF PREFERRED EMBODIMENT(S)

Figure 1:
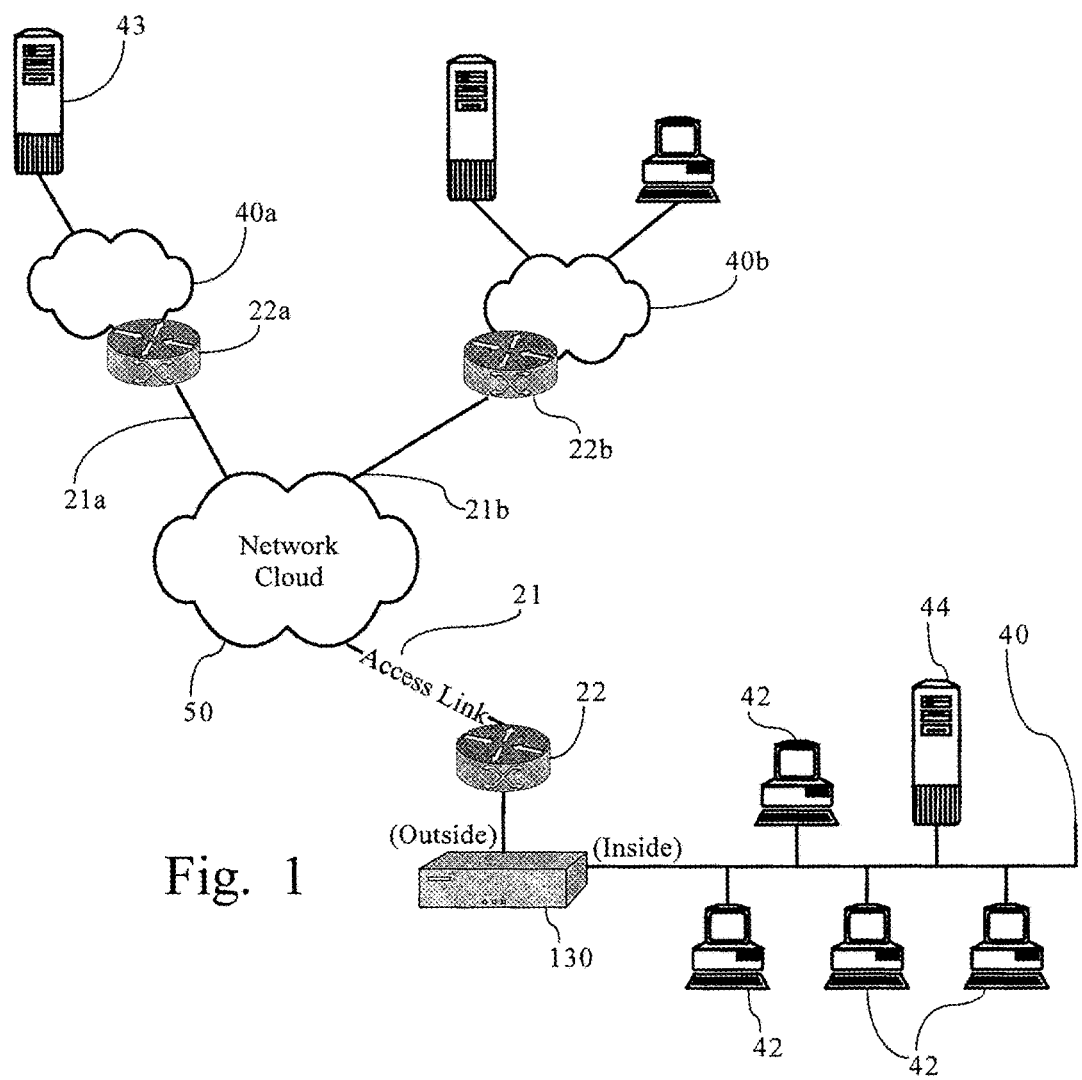
FIG. 1 is a functional block diagram illustrating a computer network system architecture in which an embodiment of the present invention may operate.
Figure 2:
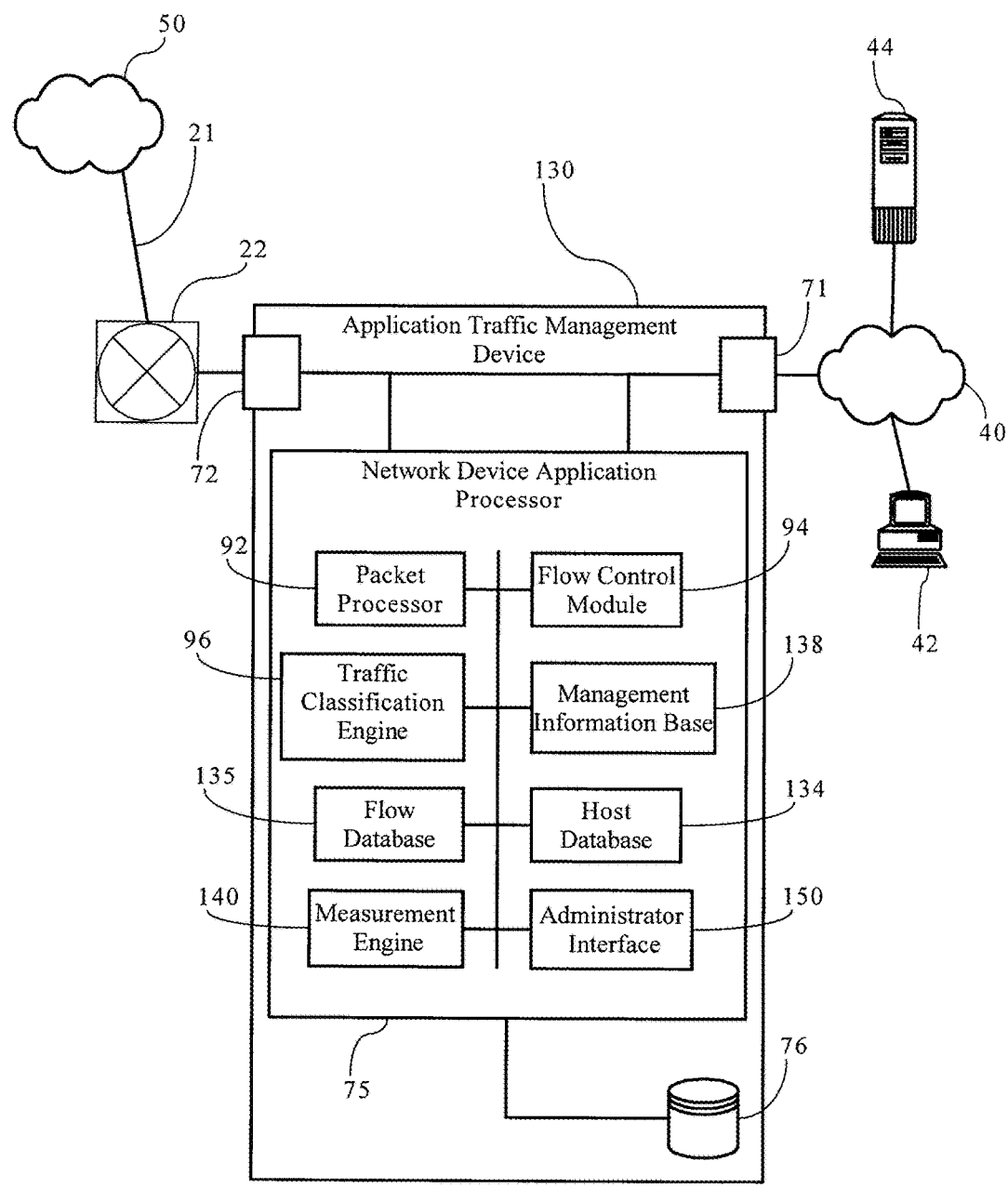
FIG. 2 is a functional block diagram illustrating the functionality of a network application traffic management device, according to one implementation of the present invention.

FIG. 1 illustrates an exemplary network environment in which embodiments of the present invention may operate. Of course, the present invention can be applied to a variety of network architectures. FIG. 1 illustrates, for didactic purposes, a network 50, such as wide area network, interconnecting a first enterprise network 40, supporting a central operating or headquarters facility, and a second enterprise network 40a, supporting a branch office facility. Network 50 may also be operably connected to other networks, such as network 40b, associated with the same administrative domain as networks 40, 40a, or a different administrative domain. As FIGS. 1 and 2 show, the first network 40 interconnects several TCP/IP end systems, including client devices 42 and server device 44, and provides access to resources operably connected to computer network 50 via router 22 and access link 21. Access link 21 is a physical and/or logical connection between two networks, such as computer network 50 and network 40. The computer network environment, including network 40 and network 50 is a packet-based communications environment, employing TCP/IP protocols, and/or other suitable protocols, and has a plurality of interconnected digital packet transmission stations or routing nodes. First network 40, and networks 40a Et 40b, can each be a local area network, a wide area network, or any other suitable network. As FIGS. 1 and 2 illustrate, application traffic management device 130, in one implementation, is deployed at the edge of network 40. As discussed more fully below, application traffic management device 130 is operative to classify and manage data flows traversing access link 21. In one implementation, application traffic management device 130 also includes functionality operative to monitor the performance of the network (such as network latency) and/or network applications.

As FIG. 2 illustrates, network application traffic management device 130, in one implementation, comprises network device application processor 75, and first and second network interfaces 71, 72, which operably connect application traffic management device 130 to the communications path between router 22 and network 40. Network device application processor 75 generally refers to the functionality implemented by application traffic management device 130, such as network monitoring or reporting, application traffic management, and the like. In one embodiment, network device application processor 75 is a combination of hardware and software, such as a central processing unit, memory, a system bus, an operating system, device drivers, and one or more software modules implementing the functions performed by application traffic management device 130. For didactic purposes, application traffic management device 130 is configured to manage network traffic traversing access link 21. The above-identified patents and patent applications, incorporated by reference herein, disclose various functionalities and features that may be incorporated into application traffic management devices according to various implementations of the present invention.

In one embodiment, first and second network interfaces 71, 72 are the hardware communications interfaces that receive and transmit packets over the computer network environment. In one implementation, first and second network interfaces 71, 72 reside on separate network interface cards operably connected to the system bus of application traffic management device 130. In another implementation, first and second network interfaces reside on the same network interface card. In addition, the first and second network interfaces 71, 72 can be wired network interfaces, such as Ethernet (IEEE 802.3) interfaces, and/or wireless network interfaces, such as IEEE 802.11, BlueTooth, satellite-based interfaces, and the like. As FIG. 2 illustrates, application traffic management device 130, in one embodiment, includes persistent memory 76, such as a hard disk drive or other suitable memory device, such writable CD, DVD, or tape drives. In other implementations, application traffic management device 130 can include additional network interfaces, beyond network interfaces 71 and 72, to support additional access links or other functionality. Furthermore, U.S. application Ser. No. 10/843,185 provides a description of the operation of various modules (according to one possible implementation of the present invention), such as network interface drivers, and data structures for receiving into memory and processing packets encountered at network interfaces 71, 72.

As FIG. 2 illustrates, network device application processor 75, in one implementation, includes a packet processor 92, flow control module 94, and traffic classification engine 96. Network device application processor 75, in one implementation, further comprises host database 134, flow database 135, measurement engine 140, management information base 138, and administrator interface 150. In one embodiment, the packet processor 92 is operative to process data packets, such as detecting new data flows, parsing the data packets for various attributes (such as source and destination addresses, and the like) and storing packet attributes in a buffer structure, and maintaining one or more flow variables or statistics (such as packet count, current rate, etc.) in connection with the data flows and/or the source/destination hosts. The traffic classification engine 96, as discussed more fully below, is operative to classify data flows based on one or more attributes associated with the data flows. Traffic classification engine 96, in one implementation, stores traffic classes associated with data flows encountered during operation of application traffic management device 130, as well as manually created traffic classes configured by a network administrator, in a hierarchical traffic class structure. In one implementation, flow control module 94 is operative to apply aggregate and per-flow bandwidth utilization controls to data flows traversing the access link 21 in the inbound and/or outbound directions.

As discussed above, in one implementation, network device application processor 75 further comprises measurement engine 140, management information base (MIB) 138, and administrator interface 150. Management information base 138 is a database of standard and extended network objects related to the operation of application traffic management device 130. Measurement engine 140 maintains measurement and statistical data relating to operation of application traffic management device 130 to allow for monitoring of bandwidth utilization and network performance across access link 21 with respect to a plurality of bandwidth utilization and other network statistics on an aggregate and/or per-traffic-class level. In one implementation, measurement engine 140 tracks a variety of metrics corresponding to the partitions implemented by flow control module 94. These metrics allow flow control module 94, as discussed in more detail below, to dynamically adjust bandwidth allocations across flows and partitions to improve or manage network application performance.

Administrator interface 150 facilitates the configuration of application traffic management device 130 to adjust or change operational and configuration parameters associated with the device. For example, administrator interface 150 allows administrators to select identified traffic classes and associate them with traffic management policies, such as partitions. Administrator interface 150 also displays various views associated with a hierarchical traffic classification scheme and allows administrators to configure or revise the hierarchical traffic classification scheme. Administrator interface 150 can provide a command line interface and/or a graphical user interface accessible, for example, through a conventional browser on client device 42.

A.1. Packet Processing

As discussed above, packet processor 92, in one implementation, is operative to detect new data flows, instantiate data structures associated with the flows and parse packets to identify packet attributes, such as source and destination addresses, port numbers, etc., and populate one or more fields in the data structures. The U.S. Patents and patent applications identified above discuss the operation of packet processors that can be incorporated into embodiments of the present invention. In one embodiment, when packet processor 92 encounters a new data flow it stores the source and destination IP addresses contained in the packet headers in host database 134. Packet processor 92 further constructs a control block (flow) object in flow database 135 including attributes characterizing a specific flow between two end systems, such as source and destination port numbers, etc. Other flow attributes in the flow object may include application specific attributes gleaned from layers above the TCP layer, such as codec identifiers for Voice over IP calls, Citrix database identifiers, and the like. Packet processor 92 also stores meta information relating to the received packets in a packet buffer—a memory space, typically in dynamic random access memory (DRAM), reserved for packets traversing application traffic management device 130. In one embodiment, the packets are stored in the packet buffer with a wrapper including various information fields, such as the time the packet was received, the packet flow direction (inbound or outbound), and a pointer to the flow object corresponding to the flow of which the packet is a part.

In typical network deployments, the majority of data flows are generally TCP or UDP flows. However, any suitable transport layer flow can be recognized and detected. As discussed more fully below, in one embodiment, flows are identified based on the following flow attributes: 1) source IP address, 2) destination IP address, 3) source port number, 4) destination port number, and 5) protocol (derived from the "protocol" field in IPv4 headers, and the "Next-Header" field in IPv6 headers). One skilled in the art will recognize that flows can be identified in relation to a variety of attributes and combinations of attributes. In addition, methods for determining new data flows and assigning packets to existing data flows are well known in the art and also depend on the particular transport layer protocol employed. For a TCP flow, for example, packet processor 92 can determine a new data flow by detecting SYN, SYN/ACK, and/or ACK packets. However, a new data flow, depending on the network protocol associated with the flow, can simply be a data flow for which there is no corresponding flow object. For example, with UDP and GRE flows (where there is no explicit connection or handshake mechanism, such as SYN packets), a new flow is recognized by associating the source and destination addresses and port numbers to the flow and the flow type (e.g., UDP, GRE, etc.). Accordingly, when a UDP packet identifies a new address/port pair, the attributes discussed above are stored in a data structure along with the time of last packet. A new UDP flow between the same address/port pairs can be determined by comparing the last packet time to a threshold value (e.g., 2 minutes). If the difference between the time of the last packet and the time of the current packet is greater than the threshold, the current packet is deemed part of a new flow. In another implementation, a background and/or separate process can periodically compare the last packet times associated with a flow to a threshold period of time and deem the flow terminated if the last packet time is beyond the threshold period of time. The termination of TCP connections is typically detected by identifying FIN packets; however, the timeout mechanisms discussed above can be used in situations where a FIN packet is not detected.

In one embodiment, a control block (flow) object contains a flow specification object including such attributes as pointers to the "inside" and "outside" IP addresses in host database 134, as well as other flow specification parameters, such as inside and outside port numbers, service type (see below), protocol type and other parameters characterizing the data flow. In one embodiment, such parameters can include information gleaned from examination of data within layers 2 through 7 of the OSI reference model. U.S. Pat. No. 6,046,980 and U.S. Pat. No. 6,591,299, as well as others incorporated by reference herein, disclose classification of data flows for use in a packet-based communications environment. FIGS. 1 and 2 illustrate the concept associated with inside and outside addresses, where network interface 71 is the "inside" network interface and network interface 72 is the "outside" network interface. As discussed above, in one embodiment, a flow specification object includes an "inside" and "outside" address relative to application traffic management device 130. See FIG. 1. For a TCP/IP packet, packet processor 92 can compute the inside and outside addresses based on the source and destination network addresses of the packet and the direction of the packet flow. Still further, packet processor 92 can also identify which host is the client and which host is the server for a given data flow and store this information in the flow specification or flow object. The identification of a server or client in a given transaction generally depends on the network protocols employed by the hosts. For example, in TCP flows, a client initiates a transaction by transmitting a SYN packet to initiate a TCP connection. Application traffic management device 130 can detect the SYN packet and note the source network address of the packet as the client host, and the destination address as the server host. One of ordinary skill in the art will recognize how to identify clients and servers in connection with other networking protocols.

In one embodiment, packet processor 92 creates and stores flow objects corresponding to data flows in flow database 135. In one embodiment, flow object attributes include a pointer to a corresponding flow specification object, as well as other flow state parameters, such as TCP connection status, timing of last packets in the inbound and outbound directions, speed information, apparent round trip time, packet count, etc. Flow object attributes further include at least one traffic class identifier (or pointer(s) thereto) associated with the data flow, as well as policy parameters (or pointers thereto) corresponding to the identified traffic class. In one embodiment, flow objects further include a list of traffic classes for which measurement data (maintained by measurement engine 140) associated with the data flow should be logged. In one embodiment, to facilitate association of an existing flow object to subsequent packets associated with a data flow or connection, flow database 135 further maintains a control block hash table including a key comprising a hashed value computed from a string comprising the inside IP address, outside IP address, inside port number, outside port number, and protocol type (e.g., TCP, UDP, etc.) associated with a pointer to the corresponding flow object. According to this embodiment, to identify whether a flow object exists for a given data flow, packet processor 92 hashes the values identified above and scans the hash table for a matching entry. If one exists, packet processor 92 associates the pointer to the corresponding flow object with the packets in the data flow.

A.2. Traffic Classification Engine

As discussed above, traffic classification engine 96, in one implementation, is operative to classify data flows into one of a plurality of traffic classes. Traffic classification engine 96, in one implementation, comprises a plurality of service type identification modules, each of which correspond to a set of service types. Each service type identification module analyzes one or more packets in a given data flow to attempt to identify a service type corresponding to the flow. A service type, in one implementation, can be a network protocol, a service, or a network-application. For example, one service type identification module can correspond to a network application, such as Citrix®, while another service type identification module can be dedicated to detecting Oracle® or PostgreSQL database traffic. Still other service type identification modules can classify HTTP flows, FTP flows, ICMP flows, RTP flows, NNTP, SMTP, SSL, DICOM and the like. In one implementation, traffic classification engine 96 passes pointers to received packets to each service type identification module, which then inspect the packets stored in the buffer memory. In one implementation, each service type identification module has an associated packet count threshold (in the aggregate, packets from server to client, or client to server) after which it no longer attempts to classify a data flow. In one implementation, the packet count threshold will vary across the service type identification modules. For example, a service type identification module dedicated to classifying Citrix® traffic may be able to classify a data flow with certainty after three packets. In many instances, application traffic management device 130 may have to encounter more than one packet corresponding to a data flow in order to finally classify the data flow. For example, the initial TCP handshake packets may only reveal IP address, port numbers and protocol identifiers. While this information may be sufficient to identify HTTP traffic, for example, additional packets (such as data packets) may reveal a more specific network application, such as an accounting application or peer-to-peer file sharing application, that utilizes HTTP. Accordingly, in one implementation, each service type identification module responds to receiving a pointer to a packet by 1) reporting a matching service type identifier and the desire to inspect more packets in the flow (to possibly identify a more specific service type identifier); 2) reporting a matching service type and no interest in inspecting subsequent packets in the flow; 3) reporting no matching service type identifier and the desire to inspect more packets in the flow; and 4) reporting no matching service type and no interest in inspecting subsequent packets in the flow.

To allow for identification of service types (e.g., FTP, HTTP, etc.), traffic classification engine 96, in one embodiment, is supported by one to a plurality of service identification tables in a relational database that allow for identification of a particular service type (e.g., application, protocol, etc.) based on the attributes of a particular data flow. Of course, other suitable data structures can be used to support the identification of service types, such as a set of hard-coded instructions, an XML file, and the like. In one embodiment, a services table including the following fields: 1) service ID, 2) service aggregate (if any), 3) name of service, 4) service attributes (e.g., port number, outside IP address, etc.), and a 5) default bandwidth management policy. A service aggregate encompasses a combination of individual services (each including different matching criteria, such as different port numbers, etc.) corresponding to the service aggregate. When application traffic management device 130 encounters a new flow, the service type identification modules of traffic classification engine 96 analyze the data flow against the service attributes in their respective services tables to identify a service ID corresponding to the flow. In one embodiment, traffic classification engine 96 may identify more than one service ID associated with the flow. In this instance, traffic classification engine 96 associates the more/most specific service ID to the flow. For example, network traffic associated with a peer-to-peer file sharing service may be identified according to a network protocol, such as TCP or HTTP traffic, as well as higher level, application-specific traffic types such as the actual file sharing application itself (e.g., Napster, Morpheus, etc.). In this instance, traffic classification engine 96 associates the flow with the most specific service ID. As a further example, an RTSP application data flow can be further classified to RTSP-Broadcast or RTSP-REALNET-TCP in the middle of the flow after a particular signature in the packets is encountered. In one implementation, traffic classification engine 96 writes the identified service type ID into the control block (flow) object corresponding to the data flow.

As discussed more fully below, service type identification, in one implementation, is a preliminary operation to the classification of a data flow according to the hierarchical traffic classification scheme configured by a network administrator. For example, a traffic class maintained by traffic classification engine 96 may be configured to include matching rules based on the service IDs in the services table. For example, a matching rule directed to HTTP traffic may simply refer to the corresponding service ID, as opposed to the individual attributes that the service type identification modules uses to initially identify the service. This implementation allows for a variety of hierarchical traffic classification configurations, such as the configuration of child traffic classes that further classify HTTP traffic on the basis of a network application, a range of IP addresses, and the like. Still further, the service type identifiers can correspond to a specific network application (e.g., Napster, Citrix, NetIQ, Oracle, Skype, etc.) and more generally to network protocols or services, such as IP, TCP, HTTP, SOAP, XML, UDP, FTP, SMTP, FTP, UDP, etc. As discussed more fully below, in one implementation, traffic classification engine 96 triggers operation of host probing module 97 for a given data flow, if a service type identifier corresponding to a network application (as opposed to a protocol or service) is not identified within a threshold number of packets.

A traffic class comprises a set of matching rules or attributes allowing for logical grouping of data flows that share the same characteristic or set of characteristics. In one implementation, the matching rules can correspond to the service type identifiers discussed above, as well as other data flow attributes, such as the network interface on which the packets are received by application traffic management device 130, whether the server is the inside or outside host (see above), non-standard and standard port numbers, host IP address or subnet, MAC address, application-specific strings, diffserv codes, MPLS tags, VLAN tags, and the like. In one embodiment, each traffic class has at least one attribute defining the criterion(ia) used for identifying a specific traffic class. In one implementation, the attributes defining a given traffic class can be based on explicitly presented attributes of one or more packets corresponding to a data flow (as discussed above), or be based on behavioral attributes of the end systems associated with the flow. The U.S. patent applications identified above disclose various network traffic classification mechanisms that can be incorporated into embodiments of the present invention. For example, a traffic class can be defined by configuring an attribute defining a particular IP address or subnet. Of course, a particular traffic class can be defined in relation to a plurality of related and/or orthogonal data flow attributes. U.S. Pat. Nos. 6,412,000 and 6,591,299, and U.S. patent application Ser. No. 10/039,992 describe some of the data flow attributes that may be used to define a traffic class, as well as the use of hierarchical classification structures to associate traffic classes to data flows. In one embodiment, application traffic management device 130 includes functionality allowing for classification of network traffic based on information from layers 2 to 7 of the OSI reference model. Application traffic management device 130 can be configured to include matching rules that define a plurality of network applications commonly found in enterprise networks, such as database applications, Citrix® flows, ERP applications, and the like. As discussed below, the matching rules or attributes for a traffic class may be based on various types of node behavior, such as the number of concurrent connections of the inside or outside host.

In one embodiment, application traffic management device 130 is configured to include a predefined set of traffic classes based upon a knowledge base gleaned from observation of common or known traffic types on current networks. Application traffic management device 130, in one embodiment, also allows an administrator to manually create a traffic class by specifying a set of matching attributes. As discussed above, administrator interface 150, in one embodiment, allows for selection of a traffic class and the configuration of traffic management policies for the selected traffic class. Administrator interface 150, in one embodiment, also allows for the selection and arrangement of traffic classes into hierarchical reference trees. In one embodiment, traffic classification engine 96 also stores traffic classes added by the traffic discovery module. Furthermore, as discussed below, application traffic management device 130 may also include traffic class discovery functionality that automatically adds traffic classes to traffic classification engine 96 in response to data flows traversing the device. Automatic network traffic discovery and classification (see below) is disclosed in U.S. Pat. Nos. 6,412,000, 6,457,051, and 6,591,299, which are incorporated herein by reference.

Traffic classification engine 96, in one implementation, stores traffic classes associated with data flows that traverse access link 21. Traffic classification engine 96, in one embodiment, stores the traffic classes and corresponding data (e.g., matching rules, policies, partition pointers, etc.) related to each traffic class in a hierarchical tree. This tree is organized to show parent-child relationships—that is, a particular traffic class may have one or more subordinate child traffic classes with more specific characteristics (matching rules) than the parent class. For example, at one level a traffic class may be configured to define a particular user group or subnet, while additional child traffic classes can be configured to identify specific application traffic associated with the user group or subnet. U.S. application Ser. No. 10/334,467, as well as other patents and patent applications identified above, disclose how traffic classification engine 96 traverses the hierarchical tree to match a data flow to a leaf traffic class node.

In one embodiment, the root traffic classifications are "/Inbound" and "/Outbound" data flows. Any data flow not explicitly classified is classified as "/Inbound/Default" or "/Outbound/Default". In other implementations, the concept of "inbound" and "outbound" is replaced by a set of policies corresponding to pairs of network interfaces, such as interfaces 71 and 72, and the direction of packet traffic. For example, packets flowing from network interface 71 to network interface 72 (and vice versa) can be classified on that basis to eliminate any potential restrictions on classification of data flows in different network topologies. A "LocalHost" traffic class, in one implementation, corresponds to packets and data flows destined for application traffic management device 130, such as requests for stored measurement data, traffic class mapping packets, or device configuration changes. In one embodiment, traffic classification engine 96 attempts to match to a leaf traffic class node before proceeding to remaining traffic class nodes in the hierarchical configuration. If a traffic class is found, the traffic classification engine 96 stops the instant search process and returns the identified traffic classification. Of course, one skilled in the art will recognize that alternative ways for traversing the hierarchical traffic class configuration can be implemented. For example, traffic classification engine 96 may be configured to traverse all traffic class nodes at a given level before proceeding to lower levels of the traffic classification tree.

In one embodiment, administrator interface 150 displays the traffic class tree and allows for selection of a traffic class and the configuration of policy for that traffic class. Administrator interface 150 also allows for the arrangement of traffic classes into a hierarchical classification tree. Application traffic management device 130 further allows an administrator to manually create a traffic class by specifying a set of matching rules and also automatically creates traffic classes by monitoring network traffic across access link 21 and classifying data flows according to a set of criteria to create matching rules for each traffic type. In one embodiment, each traffic class node includes a traffic class identifier; at least one traffic class (matching) attribute; at least one policy parameter (e.g., a bandwidth utilization control parameter, etc.), a pointer field reserved for pointers to one to a plurality of child traffic classes. In one embodiment, traffic classification engine 96 implements a reference tree classification model wherein separate traffic classification trees can be embedded in traffic class nodes of a given traffic classification tree. U.S. application Ser. No. 10/236,149, incorporated by reference herein, discloses the use and implementation of embeddable reference trees.

A.3. Flow Control Module

As discussed more fully below, flow control module 94 enforces aggregate, partition-based bandwidth utilization controls on data flows traversing access link 21. In one implementation, flow control module 94 monitors bandwidth demand of each partition relative to an aggregate, weighted fair share allocation scheme, and dynamically re-distributes unutilized bandwidth to partitions whose demand for bandwidth exceeds its weighted fair share allocation. As discussed in more detail below, flow control module 94 performs these dynamic allocation adjustments on a continuous basis, as needed. In one implementation, the demand for bandwidth at a given partition can be evaluated in a number of ways. For example, the size of, and rate at which, packets in a flow are received by application traffic management device 130 during a given time interval can be monitored to compute a per-flow rate demand. The per-flow rate demands for all flows falling within a given partition can be aggregated to yield an aggregate rate demand for the partition. In addition, these computed rate values can be smoothed by maintaining a rolling average or weighted moving average across a sliding window of time. Aggregate rate demand for a partition may also be determined by analyzing the number of packets queued in a corresponding partition queue over a given analysis interval. For example, the change in the number of packets queued in a given partition queue over an analysis interval can be analyzed to determine the aggregate rate demand for a given partition. As discussed in more detail below, flow control module 94 can then dynamically allocate unutilized bandwidth to partitions where the aggregate rate demand exceeds their respective bandwidth allocations. In one implementation, the weighting values associated with the partitions determines in part how unutilized bandwidth is distributed.

In addition, flow control module 94, in some implementations, can optionally apply per-flow bandwidth utilization controls, on data flows traversing access link 21. In one implementation, flow control module 94 includes a partitioning module operative to enforce aggregate bandwidth utilization controls (e.g., partitions), and a per-flow rate control module operative to apply per-flow rate controls on data flows. In one implementation, flow control module 94 implements the deterministic partition scheduling functionality disclosed in U.S. application Ser. No. 10/108,085, incorporated by reference herein. Furthermore, as discussed more fully below, flow control module 94 includes functionality for dynamically adjusting aggregate bandwidth allocation among partitions. In one implementation, flow control module 94 also includes processes that dynamically adjust per-flow bandwidth allocation within partitions. A partition operates to manage bandwidth for aggregate data flows associated with a traffic class. As discussed above, a partition is essentially a division of the capacity of access link 21. Still further, flow control module 94, in some implementations, may also implement per-flow rate policies on the data flows. In one implementation, flow control module 94 implements the TCP Rate Control technologies disclosed in U.S. Pat. No. 6,038,216 to control the rate at which transmitters send data and therefore the amount of data that is queued in buffers at application traffic management device 130.

A.3.a. Weighted Policy Configuration

According to one implementation of the present invention, the user configuration interface implemented by application traffic management device 130 allows the user to configure a bandwidth partition scheme, such as the hierarchical configurations illustrated in FIGS. 9A thru 9F. In one implementation, the partition configuration can directly map, on a one-to-one basis, to the hierarchical traffic class configuration used to classify network traffic, where all traffic gets matched to a leaf node in the traffic class tree. However, in other implementations, the partition configuration may be orthogonal to the traffic class configuration. In one implementation, where only leaf partition nodes are scheduled for egress from application traffic management device 130, each leaf traffic class must be associated with a leaf partition node in the partition configuration hierarchy. Similar to the traffic class tree, the root partition node represents the capacity of the access link in either the inbound or outbound directions. In one implementation, separate partition configurations and controls can be maintained for data flows traveling in the inbound or outbound directions relative to network 40. In other implementations, a single partition configuration can be applied to both inbound and outbound data flows.

Once a partition configuration is established, in one implementation, a user can simply assign a weight to each partition node, which essentially expresses the priority of the network traffic class(es) falling within the partition relative to other traffic classes. Optionally, a user may also assign a minimum aggregate bandwidth allocation to one or more of the selected partition nodes. As discussed in more detail below, each partition is then allocated a fair share of available bandwidth based on the weights assigned to the partitions, limited by the minimum and maximum bandwidth settings configured for any partitions. In another implementation, a user may also specify a maximum bandwidth allocation for one or more partitions. In one implementation, unless the user specifically configures a weighting value for at least one partition in a given level of the hierarchy, by default, each sibling partition is weighted equally. Additionally, if a user configures a weighting value for only one partition, each sibling partition is configured with a default weighting value. In one implementation, administrator interface 150 requires the user to enter weighting values for all sibling partitions after a user initially configures a weighting value for a selected partition.

After the user has completed a configuration, administrator interface 150, in one implementation, processes the configuration to create an aggregate bandwidth allocation scheme that includes partitions, and optionally per-flow rate policies, based on the received configuration. For example, partition queues are created for each leaf partition, and weighted, fair share bandwidth allocations are computed for the partitions, as discussed in more detail below. In addition, in one implementation, each active data flow within a given partition is also guaranteed a fair share of the bandwidth allocated to the partition. The aggregate fair share allocation for each partition is generally stable, unless there are configuration changes. However, the fair share allocation for each flow changes dynamically based on the number of active flows in the partition. In addition, the actual bandwidth allocated to a given partition at a given point in time may change dynamically in response to network traffic demands.

The following configurations and resulting partition configurations are provided below for didactic purposes.

Case 1: Partitions with Weights

Figure 9A:
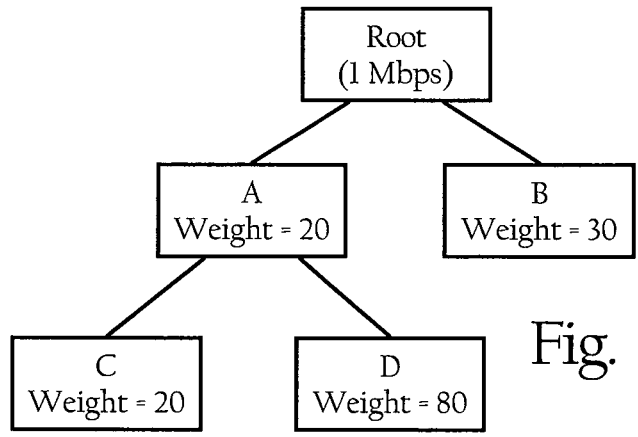
FIGS. 9A thru 9F illustrate hierarchical partition configurations according to various implementations of the present invention.

FIG. 9A illustrates a hierarchical partition configuration including three leaf partition nodes (B, C & D). Each node of the partition hierarchy includes a weight that determines the fair share of the bandwidth a given partition node is allocated from a parent partition relative to its sibling partition nodes. In one implementation, starting from the root node, the weights of the direct child nodes (here, A & B) are compared to allocate available bandwidth of the root partition. The bandwidth allocation that each node receives, in one implementation, is based on the following equations:

$$\text{Aggregate Weight} = \sum \text{Weights from Child Nodes}$$

$$\text{Allocation Per Partition}(c) = \frac{\text{Parent Allocation} * \text{Configured Weight of Partition}(c)}{\text{Aggregate Weight}}$$

Table 1, below, illustrates the bandwidth allocations resulting from application of the foregoing fair share algorithms to the configuration illustrated in FIG. 9A.

TABLE 1

| Partition | Weighted Fair share |
|---|---|
| A | 400K |
| C | 80K |
| D | 320K |
| B | 600K |

Case 2: Partitions with Weights and Minimum Bandwidth Settings

As in the above example, the fair share bandwidth allocation is again computed based on the weights of sibling partitions, starting from the root partition and ultimately down to the leaf partition nodes. However, the minimum bandwidth settings associated with one or more child partitions limits the amount of bandwidth distributed according to a weighted, fair share algorithm. In one implementation, the following equation describes the bandwidth allocation accorded to each child partition, where TotalConfigMin is the sum of the minimum bandwidth settings for all sibling partitions depending from the parent partition whose bandwidth is being allocated.

$$\text{AllocationPerPartition}(c) = \text{ConfigMin}(c) + (\text{ParentAllocation} - \text{TotalConfigMin}) * \frac{\text{Weight of Partition}}{\text{Aggregate Weight}}$$

Figure 9B:
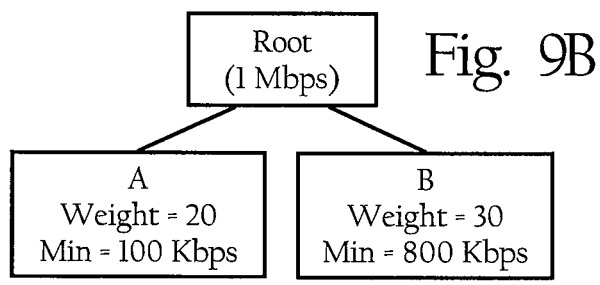

Table 2 sets forth the resulting aggregate bandwidth allocation for the configuration illustrated in FIG. 9B.

TABLE 2

| Partition | Weighed Fair Share |
|---|---|
| A | 100k + (1M − 900k) * 20/50 = 140k |
| B | 800k + (1M − 900k) * 30/50 = 860k |

As the foregoing illustrates, the aggregate configured minimum bandwidth settings (Total ConfigMin) leaves 100 Kbps to distribute according to a weighted, fair share algorithm.

Case 3: Traffic Partition with Maximum Bandwidth Settings (with or without Minimums)

Figure 9C:
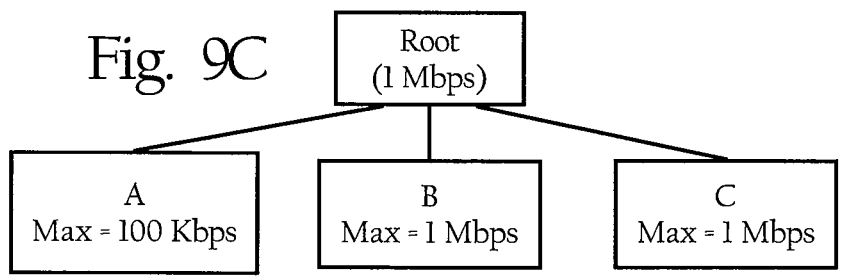
Figure 9D:
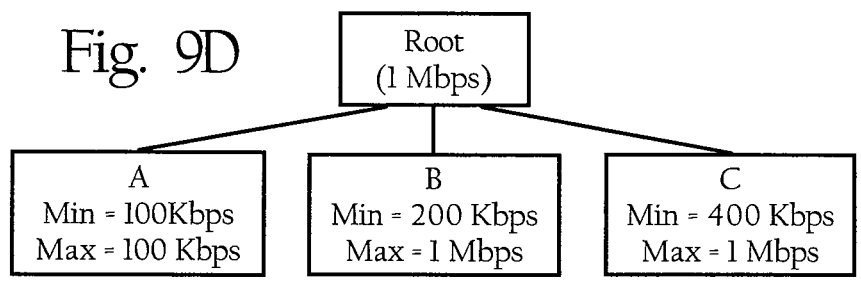

In the case where a given partition includes a maximum bandwidth setting, a redistribution of excess bandwidth may be required if the weighted fair share that would be otherwise allocated to the partition exceeds its maximum bandwidth setting. For didactic purposes, assume the partition configuration set forth in FIG. 9C. In a first allocation round, assuming that the weights configured for each partition are equal, the initial aggregate allocation for each node is 333 Kbps. However, since maximum bandwidth settings have been configured, a check must be made to determine whether the computed allocation exceeds the maximum bandwidth setting for any child node. In the example of FIG. 9C, Partition A has been configured with a maximum bandwidth setting of 100 Kbps; accordingly, an unallocated share of 233 Kbps is available for distribution to the sibling nodes based on their respective weights and maximum bandwidth settings. Given that Partitions B and C are equally weighted, each partition is allocated 450 Kbps (333 Kbps+233 Kbps*½).

In addition, a slightly different computation may result if one or more partition nodes of the partition hierarchy includes a minimum bandwidth setting. For example, assuming the partition configuration illustrated in FIG. 9D and an equal weighting of partitions, the initial weighted fair share would be: 1) Partition A—200 Kbps [100 Kbps (min)+100 Kbps (fair share)]; 2) Partition B—300 Kbps [200 Kbps (min)+100 Kbps (fair share)]; and Partition C—500 Kbps [400 Kbps (min)$_+$100 Kbps (fair share)]. However, since the maximum bandwidth setting for Partition A is less than the weighted fair share allocation, the excess bandwidth (100 Kbps) is redistributed among the sibling partitions, resulting in an aggregate bandwidth allocation of: 1) Partition A—100 Kbps; 2) Partition B—350 Kbps; and Partition C—550 Kbps.

Figure 9E:
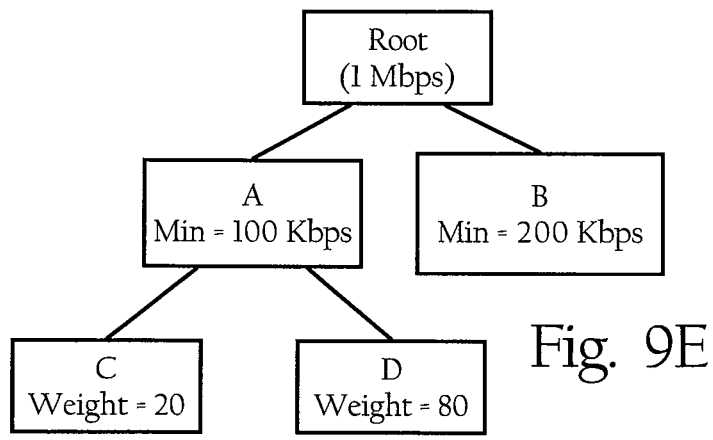
Figure 9F:
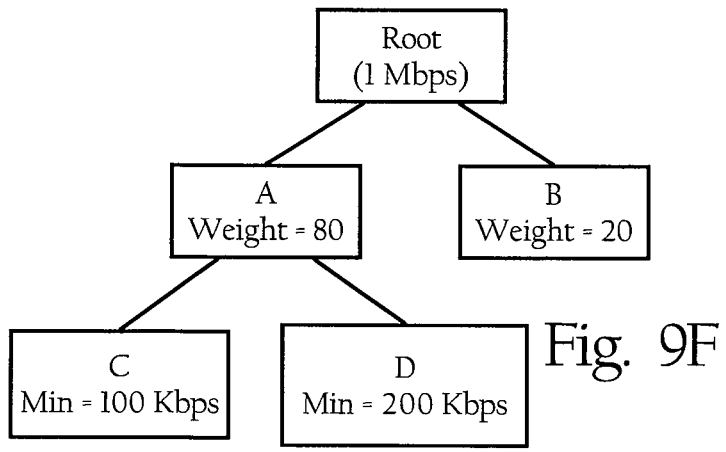

The didactic examples discussed above are intended to illustrate various attributes of the weighted, fair share mechanism by which bandwidth is allocated to partitions. Other partition configurations are possible. For example, FIG. 9E illustrates a partition configuration where Partitions A and B, at a first level, are configured with minimum bandwidth settings and a default weighting of 1, while the child partitions C and D are configured with weights to control their respective bandwidth allocations from Partition A. Similarly, FIG. 9F illustrates a partition configuration, where the bandwidth allocation at a first level is configured with weights, while the bandwidth allocation between Partitions C and D are configured with minimum bandwidth settings. From the foregoing, one skilled in the art can determine how bandwidth is initially distributed from parent to child nodes in a partition configuration hierarchy based on weights, and minimum/maximum bandwidth settings. In addition, as discussed more fully below, each data flow corresponding to a given partition is allocated a portion of that partition's bandwidth allocation based on a fair share algorithm discussed below. Still further, the aggregate bandwidth allocation across partitions can be dynamically adjusted from this initial configuration based on actual observed bandwidth demand. In one implementation, excess bandwidth available from partitions that under-utilize their configured share can be temporarily distributed to partitions that can consume additional bandwidth (referred to herein as compensation demand).

A.3.b. Overall Packet Processing Flow

Figure 6:
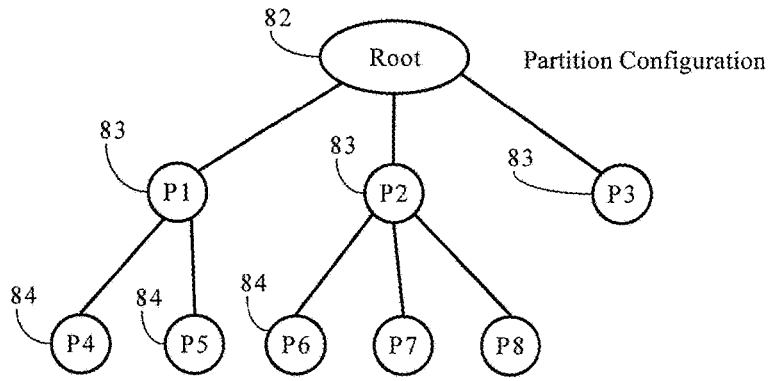
FIG. 6 sets forth an exemplary hierarchical partition configuration according to an embodiment of the present invention.
Figure 5:
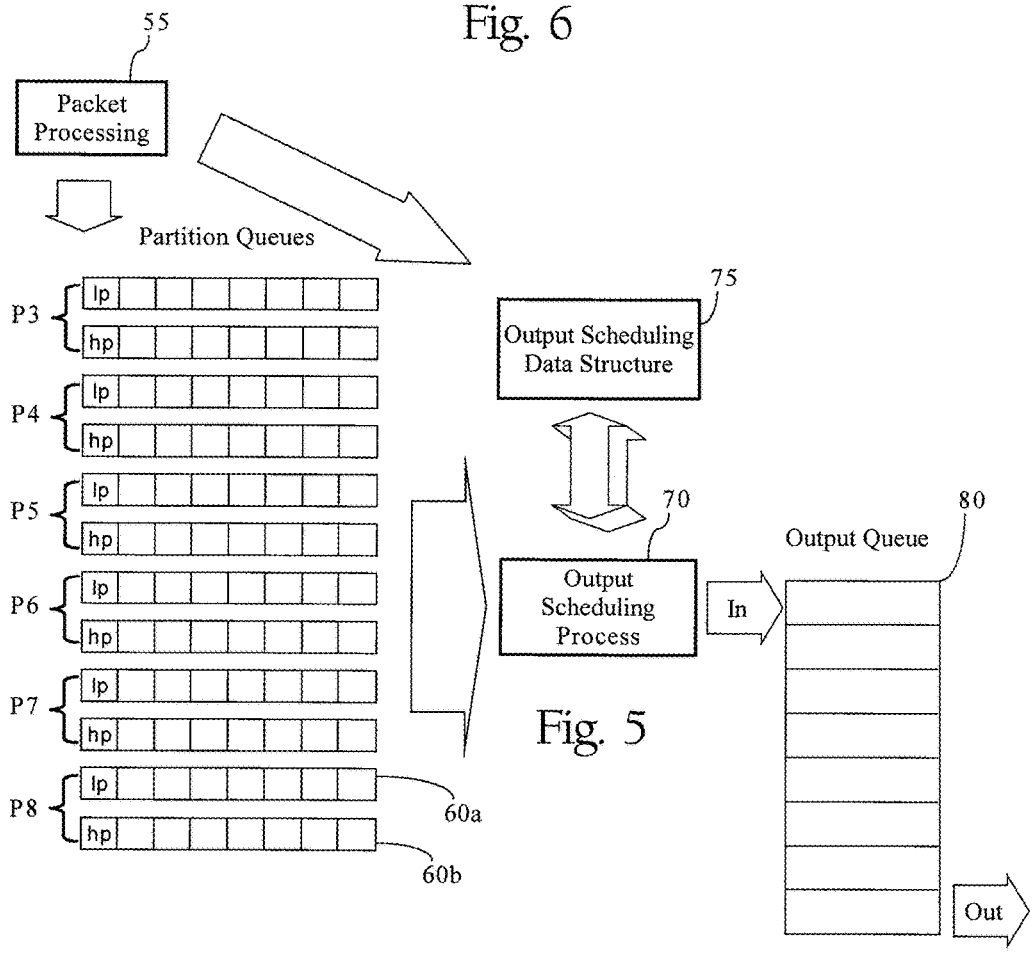
FIG. 5 is a process flow diagram illustrating the overall process flow associated with the scheduling of packets for output.

FIG. 6 provides, for didactic purposes, an exemplary hierarchical partition configuration. Root partition node 82 represents the total capacity of access link 21 in either the outbound or inbound direction. In one implementation, separate data structures and processes are maintained for the outbound and inbound directions. Partition nodes 83 represent a first set of partitions allocating the capacity of access link at a first level. As FIG. 6 shows, each parent partition may include child partitions represented as partition nodes 83 and 84. For didactic purposes, assume that access link 21 is a T1 line and, thus, provides maximum available bandwidth of 1.5 Mbps. Partitions P1, P2, and P3 may be configured with weights, as discussed above, to equally divide access link 21 into 0.5 Mbps partitions at a first level. In addition, child partitions P4 and P5 may further divide parent partition P1 into a 0.2 Mbps partition (P4) and a 0.3 Mbps partition (P5). Similarly, child partitions P6, P7 and P8 may divide parent partition P2 into two 0.1 Mbps partitions (P6 and P8), and a 0.3 Mbps partition (P7). As discussed above, the initial aggregate bandwidth allocations may also be derived from weights associated with the partition nodes. Of course, any suitable partition configuration may be employed, including the configurations illustrated in FIGS. 9A thru 9F, see above. Still further, other configurations are possible. For example, the root node may represent the access link in both the inbound and outbound direction, while child partitions from the root can correspond to traffic encountered at a given network interface (such as interface 71) and destined for egress from a second network interface (such as interface 72). FIG. 5 illustrates the overall process flow associated with an output scheduling process according to an embodiment of the present invention. In one implementation, flow control module 94 implements a modified form of the deterministic output scheduling process disclosed in U.S. application Ser. No. 10/108,085. Specifically, partition queues corresponding only to leaf partitions are created. Accordingly, while parent partitions are selected as part of the output scheduling process, packets are scheduled only from leaf partitions queues. Still further, as FIG. 5 illustrates, each partition includes a low priority partition queue 60a and a high priority partition queue 60 which facilitates certain per-flow rate management tasks, as discussed more fully below. Still further, both the low priority and high priority partition queues 60a, 60b store pointers to flow queues that buffer packets on a per-flow basis, as discussed more fully below. Of course, other implementations are possible. For example, the use of high priority and low priority partition queues can be eliminated. In addition, the use of flow queues can also be eliminated, causing packets to be buffered in partition queues, as disclosed in U.S. application Ser. No. 10/108,085.

Otherwise, the deterministic output scheduling functionality disclosed in U.S. application Ser. No. 10/108,085 is generally implemented. For example, application traffic management device 130 processes packets traversing it to identify traffic classes and corresponding partitions associated with the packets (see FIG. 5, #55). Application traffic management device 130 then pushes the packets or pointers to the packets on corresponding flow queues, which themselves are pushed onto corresponding partition queues 60a, 60b. In one embodiment, if the partition associated with the packets was previously inactive, the packet processing process 55 also updates output scheduling data structure 75 to add a corresponding partition identifier, as discussed in U.S. application Ser. No. 10/108,085, to allow for scheduling of the packets for output. As FIG. 5 illustrates, an output scheduling process 70 operates on output scheduling data structure 75 to select partitions, pops flow queues off respective partition queues, pops packets off flow queues, and pushes the packets on output queue 80, according to the methods described herein. As discussed below, flow queues are re-inserted into a partition queue if they contain additional packets. Another process associated with application traffic management device 130 releases the packets from output queue 80 and performs other processes such as logging of data associated with measurement engine 140.

Figure 3:
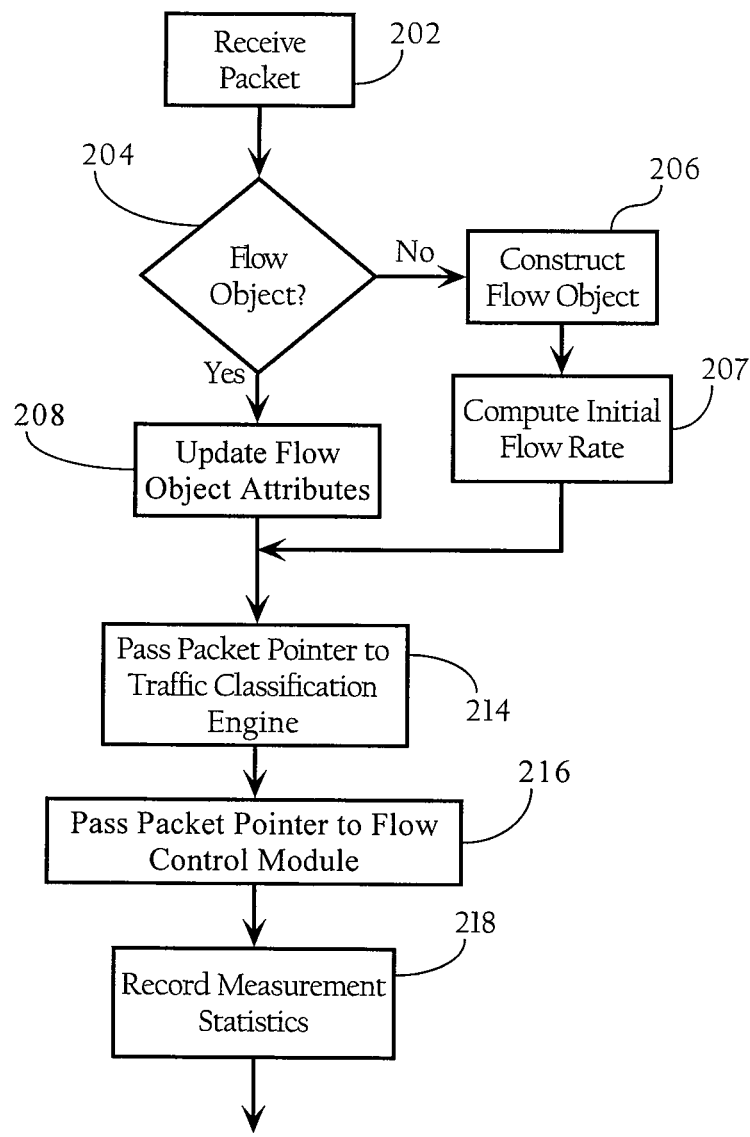
FIG. 3 is a flow chart diagram showing a method, according to one implementation of the present invention, directed to processing data flows.

FIG. 3 illustrates the overall process flow, according to one implementation of the present invention, directed to the operation of application traffic management devices 130. In one embodiment, packet processor 92 receives a data packet (FIG. 3, 202) and determines whether flow database 135 contains an existing flow object corresponding to the data flow (204) (see Section A.1., supra). If no flow object corresponds to the data packet, packet processor 92 constructs a flow object including attributes characterizing the data flow, such as source address, destination address, etc. (206) (see above). In one embodiment, packet processor 92 analyzes the source and destination IP addresses in the packet header and scans host database 134 for matching entries. If no matching entries exist, packet processor 92 creates new entries for the source and destination IP addresses. As discussed above, in one embodiment, a flow object contains a flow specification object including such attributes as pointers to the "inside" and "outside" IP addresses in host database 134, as well as other flow specification parameters, such as inside and outside port numbers, protocol type, pointers to variable-length information in a dynamic memory pool, and other parameters characterizing the data flow. In addition, packet processor 92 also computes an estimated initial data rate for the flow (207). In one implementation, packet processor 92 uses the rapid data rate detection technologies disclosed in U.S. Pat. No. 5,802,106 to provide an initial estimate of the data rate for the flow. In one implementation, the estimated data rate is stored in a field of the flow object. In one implementation, this initial rate estimate is replaced, as more packets in the flow traverse application traffic management device 130, by a current rate based on weighted moving average over an analysis interval.

As FIG. 3 illustrates, packet processor 92 updates, for existing data flows, attributes of the flow object in response to the packet such as the packet count, last packet time, and the like (208). Packet processor 92 can also perform other operations, such as analyzing the packets for connection state information. For example, packet processor 92 can inspect various TCP flags to determine whether the received packet is part of a new data flow or represents a change to an existing data flow (such as the first data packet after the TCP handshake). Methods for determining new data flows and assigning packets to existing data flows are well known in the art and also depend on the particular transport layer protocol employed. For a TCP packet, packet processor 92 can determine a new data flow by detecting SYN and/or SYN/ACK packets. However, a new data flow can simply be a data flow for which there is no corresponding flow object in flow database 135. In addition, with UDP and GRE flows (where there is no explicit connection mechanism, such as SYN packets), a new flow is recognized by associating the source and destination addresses and port numbers to the flow and the flow type (e.g., UDP, GRE, etc.). Accordingly, when a UDP packet identifies a new address/port pair, the attributes discussed above are stored in a data structure along with the time of last packet. A new UDP flow between the same address/port pairs can be determined by comparing the last packet time to a threshold value (e.g., 2 minutes). If the difference between the time of the latest packet and the time of the last packet is greater than the threshold, the new packet is deemed part of a new flow. In another embodiment, a separate process monitors the last packet times associated with UDP, GRE and similar flow types to detect termination of a given flow. In one implementation, this separate process can also be passed pointers to TCP FIN packets to adjust various data structures, such as reallocating flow object space to a pool of available memory, adjusting flow counts in traffic class or partition objects.

As FIG. 3 illustrates, packet processor 92 then passes a pointer to the packet, in one implementation, to traffic classification engine 96, which operates as discussed above to classify the data flow (214). Lastly, the packet is passed to flow control module 94 (218), which performs flow control operations on the data packets. For example, flow control module 94 identifies the appropriate partition to which the packet belongs, and applies the partition and per-flow policies to the packet. As FIG. 3 illustrates, application traffic management device 130 may also perform other operations in response to arrival of the packet. For example, measurement engine 140 may record certain measurement variables on an aggregate or per-traffic class basis (218). For example, measurement engine 140 may include one or more traffic class and partition objects that maintain statistics or other parameters used by flow control module 94 to dynamically adjust aggregate and per-flow bandwidth allocations. For example, each partition object, in one implementation, may include the following statistics: 1) a flow count (the number of currently active flows); 2) current rate (a weighted moving average in bps of the rate observed for the flows in the class); 3) aggregate compensation demand; and 4) aggregate unutilized fair share. In addition, per-flow statistics are also maintained, such as the current rate of the flow (a weighted moving average over an analysis interval of the rate at which packets are transmitted from application traffic management device), packet count, and the like. One skilled in the art will recognize that the order of processing operations illustrated in FIG. 3 is one possible process flow and that the flow control processes described herein can be performed at other points in the packet processing path.

A.3.c. Reading Packets onto Flow and Partition Queues

Figure 4A:
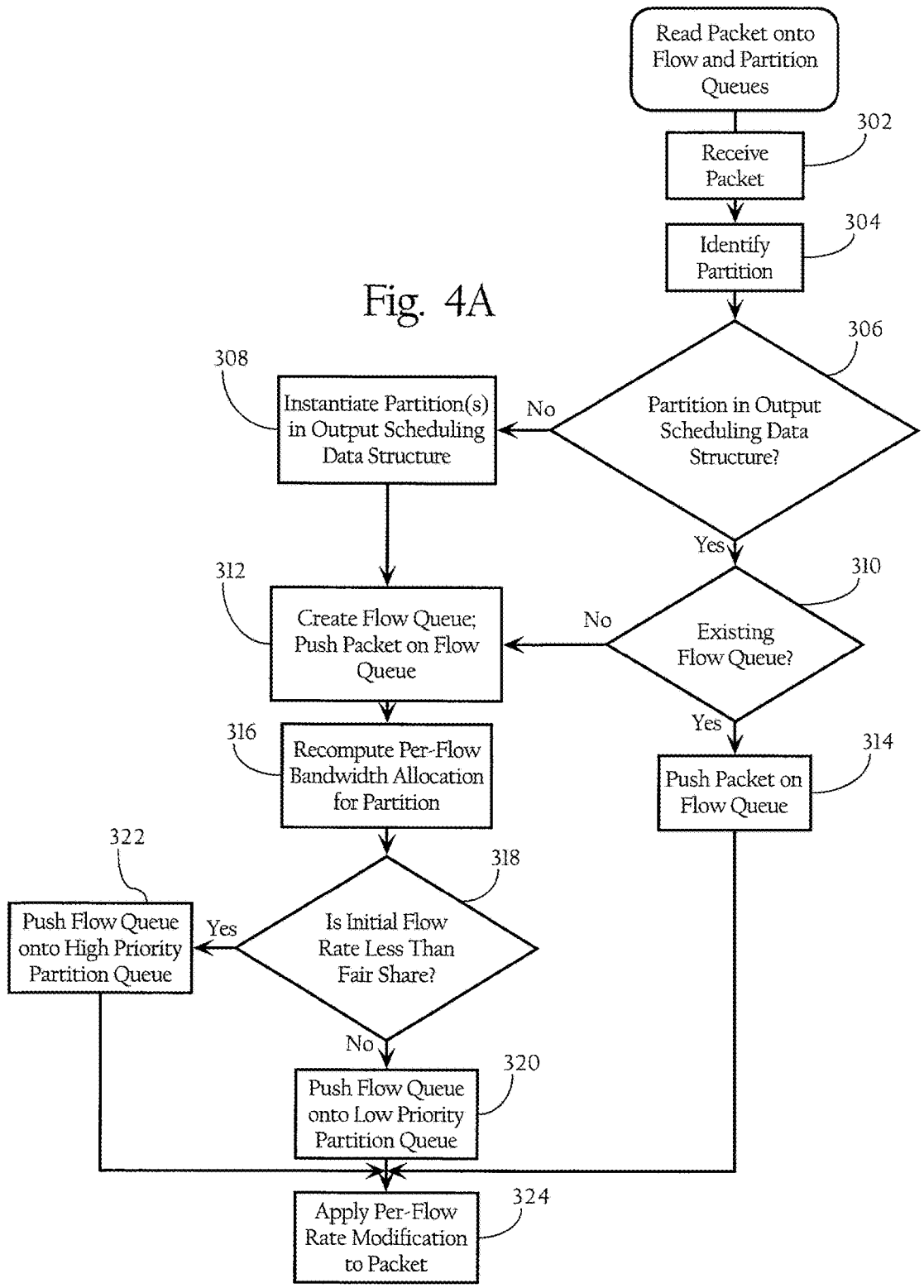
FIG. 4A is a flow chart diagram illustrating a process involving reading a packet onto a flow queue and a partition queue.

FIG. 4A illustrates a process, according to one implementation of the invention, directed to reading packets onto flow and partition queues. In one implementation, when flow control module 94 receives a packet pointer (302) and identifies a partition corresponding to the packet (304), it determines whether the output scheduling data structure 75 contains the identified partition (306). If not, flow control module 94 instantiates the partition in the output scheduling data structure 75, as disclosed in U.S. application Ser. No. 10/108,085 (308). As discussed therein, flow control module 94 may add the identified partition and any parent partition identifiers, if required. If the output scheduling data structure 75 contains the identified partition, flow control module 94 then determines whether a flow queue exists for the flow corresponding to the received packet (310). If a flow queue exists, flow control module 94 pushes the received packet pointer onto the corresponding flow queue (314). If a flow queue does not exist, however, flow control module 94 creates a flow queue and pushes the packet pointer onto the flow queue (312). In addition, since the packet represents the addition of a new flow to a partition, flow control module 94 re-computes the per-flow bandwidth allocation for the partition (316), as discussed in a following section. Flow control module 94 then determines whether to push the flow queue onto the high priority (60*b*) or low priority (60*a*) partition queue corresponding to the identified partition. In one implementation, if the initial flow rate of the flow is less than the per-flow fair share for the partition (318), flow control module 94 pushes the flow queue onto the high priority queue (322), facilitating the chance for the rate of the flow to increase. Otherwise, flow control module 94 pushes the flow queue onto the low priority queue 60*a* corresponding to the identified partition (320). In one implementation, flow control module 94 applies a process directed to the per-flow rate enforcement. In one implementation, the per-flow target rate is enforced by mapping the target rate to an advertised TCP window size, as disclosed in U.S. Pat. No. 6,038,216, and modifying the advertised window size in the TCP ACK fields of packets transmitted back to the transmitter to modify the rate at which subsequent packets are sent. Of course, the per-flow rate control processes may be applied to the packets at any point prior to egress from application traffic management device 130. In addition, the use of TCP Rate Control technologies to control the rate of data transmission from end hosts is an optional feature.

A.3.d. Computing Per-Flow Bandwidth Allocation

Figure 4B:
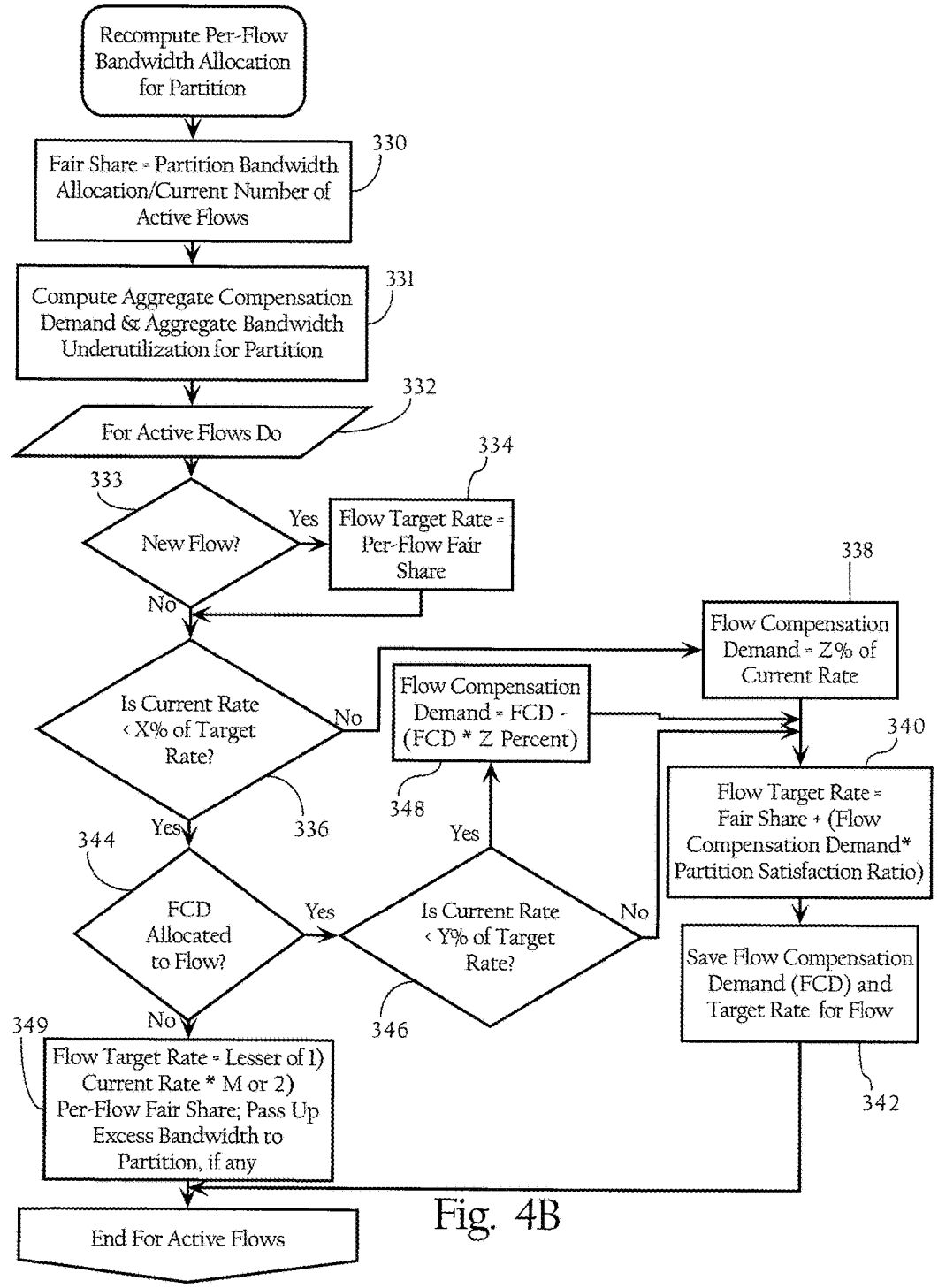
FIG. 4B is a flow chart diagram setting forth a process directed to re-computing a per-flow bandwidth allocation within a partition.

FIG. 4B sets forth a method, according to one implementation of the invention, directed to computing a per-flow fair share allocation and a target rate for flows within a given partition. As FIG. 4B illustrates, the per-flow fair share bandwidth allocation is the current aggregate bandwidth allocated to the partition divided by the number of active flows (330). As discussed above, the current number of active flows is maintained in a traffic class or partition object. The per-flow fair share rate can be used in a variety of ways. In one implementation, the per-flow fair share rate can be used as the basis of determining whether packets corresponding to a flow are placed on the high or low priority partition queue. In another implementation, the per-flow fair share rate can be used in a process that computes a target rate for each flow within a partition.

According to one implementation, the allocation of bandwidth to flows within a given partition is an optional step. In such an implementation, as FIG. 4B illustrates, flow control module 94 computes the aggregate compensation demand and the aggregate bandwidth underutilization for the partition (331). Compensation demand occurs when the current rate of a flow exceeds a threshold based on a percentage of the target rate of the flow. In one implementation, the compensation demand threshold is 94% of the per-flow target rate; however, this percentage can vary based on various engineering and design considerations. The compensation demand for a flow, in one implementation, is a fixed percentage of the detected current rate for the flow. As discussed above, the current rate can be estimated, in one implementation, by monitoring the size of incoming packets and the time at which they are received. Aggregate compensation demand for a partition is the sum of the compensation demands for each flow. Oppositely, bandwidth underutilization (unutilized fair share) occurs when the current rate associated with the flow is less than a percentage of the target rate, and is computed based on the difference between the per-flow fair share bandwidth allocation and the current rate. In one implementation, the aggregate bandwidth underutilization for a partition is thus the sum of the individual bandwidth underutilization values for the flows in the partition.

As FIG. 4B illustrates, flow control module 94, in one implementation, distributes some of the unutilized bandwidth within a partition to flows having compensation demand in the partition. In one implementation, flow control module 94, for all active flows in the partition (332), checks whether the current rate of the flow is less than X percent of the target rate of the flow (336). As discussed above, in one implementation, X=94. As FIG. 4B illustrates, the target rate for new flows (333) is the per-flow fair share previously computed (330). If the current rate of the flow is less than X percent of the target rate, flow control module 94 then determines whether a flow compensation demand has been previously allocated to the flow in a previous cycle (344). If so, flow control module 94 then determines whether the current rate is less than Y percent of the target rate (346). In one implementation, Y equals 88; however, other values can be used depending on engineering and design considerations. If both 344 and 346 are met, flow control module 94 steps the flow compensation demand (FCD) down by Z percent of the previously allocated flow compensation demand (348). In one implementation, Z equals 6 percent; however, other values can be used. While other implementations are contemplated by the invention, the foregoing prevents temporary fluctuations in data rates from substantially affecting the flow target rate, thereby allowing the rate of the flow to potentially increase. Otherwise, if a flow compensation demand was not previously allocated to the flow (344), flow control module 94 assigns a target rate equal to the lesser of 1) the current rate of the flow multiplied by a factor M, which in one implementation is 1.5; or 2) the per-flow fair share bandwidth allocation (349). As FIG. 4B illustrates, the excess bandwidth (Fair Share less Current Rate), if any, is passed up to the partition to enable subsequent calculations of aggregate bandwidth underutilization. Assigning a target rate that is greater than the measured current rate helps to avoid the recursive spiral by which the flow data rate decreases, allowing the flow data rate to increase up to the fair share allocation.

As FIG. 4B illustrates, if the current rate of the flow is greater than or equal to X percent of its target rate (336), flow control module 94 computes a flow compensation demand based on Z percent of the current rate (338). Flow control module 94 assigns a flow target rate equal to the per-flow fair share bandwidth allocation, plus the compensation demand for the flow multiplied by the partition satisfaction ratio (340). In one implementation, the partition satisfaction ratio is the aggregate bandwidth utilization divided by the aggregate compensation demand. Flow control module 94 then saves the flow compensation demand and the target rate for the flow in the corresponding flow object (342).

One skilled in the art will recognize that other methods of computing a target rate can be used. For example, the target rate can be simply set to the per-flow fair share computed for the partition regardless of the current rate. In other implementations, the target rate can simply be set to the current rate of the flow. Still further, as discussed above, the allocation of bandwidth to individual flows within a partition can be eliminated altogether, while the use of per-flow fair share calculations can still be used to determine on which of the low or high priority queues a data flow should be queued (see below).

A.3.e. Scheduling Packets onto Output Queue

FIGS. 4C and 4D, together, illustrate a method, according to one implementation of the invention, directed to scheduling packets on the output queue and pushing flow queues onto the appropriate partition queue. As discussed above and as illustrated in U.S. application Ser. No. 10/108,085, a process associated with flow control module 94 operates to select partitions for output. As FIG. 4C illustrates, flow queues in the high priority partition queue 60*b* corresponding to the selected partition are serviced before flow queues in the low priority partition queue 60*a* (see 350, 351, 352). In one implementation, the first flow queue in the low/high priority partition queue is popped from the queue (354). Flow control module 94 then pops the first packet in the flow queue (356) and pushes the packet onto the output queue 80 (358). If there are no more packets in the flow queue (360), flow control module 94 deletes the flow queue (362). Otherwise, flow control module 94, in one implementation, determines whether to push the flow queue onto the low or high priority partition queue based on the current rate of the flow. As FIG. 4C illustrates, flow control module 94 determines the priority of the flow queue (364) by comparing the current rate of the flow to the per-flow fair share bandwidth allocation for the partition (FIG. 4D, 370, 372, 374). If the current rate of the flow is greater than the per-flow fair share bandwidth allocation, the flow queue is pushed onto the low priority queue (372, 366); otherwise, flow control module 94 pushes the flow queue onto the high priority queue (374, 366). As discussed in U.S. application Ser. No. 10/108,085, flow control module 94 updates the time stamp of the partition in the output scheduling data structure 75 based on the aggregate bandwidth allocation corresponding to the partition (368).

A.3.f. Adjustments to Aggregate Bandwidth Allocations

Figure 7:
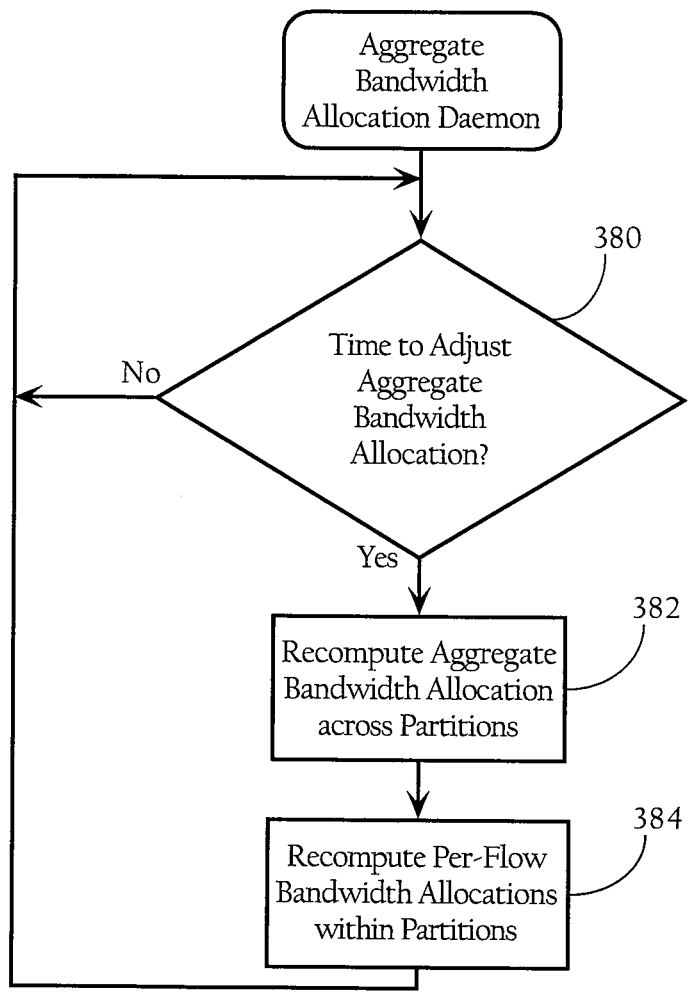
FIG. 7 is a flow chart diagram illustrating operation of an aggregate bandwidth allocation daemon, according to one implementation of the present invention.

In one implementation, flow control module 94 includes an aggregate bandwidth allocation daemon that operates at periodic intervals (e.g., 125 milliseconds, etc.) to update the aggregate bandwidth allocation across the partitions based on the weighted fair share allocations, and the observed aggregate compensation demand and aggregate bandwidth underutilization. In one implementation, flow control module 94 distributes unutilized or excess bandwidth to partitions whose demand for bandwidth may exceed its current allocation based on the weighting values associated with each partition. In other words, excess bandwidth, in one implementation is distributed based on the relative weights of the child partitions. FIG. 7 illustrates the overall process flow associated with one implementation of the present invention. At periodic intervals (380), the aggregate bandwidth allocation daemon operates to invoke a process that, as discussed below, re-computes aggregate bandwidth allocations across the partitions (382), and a process (discussed above) to re-compute the per-flow bandwidth allocations within the partitions (384).

Figure 8A:
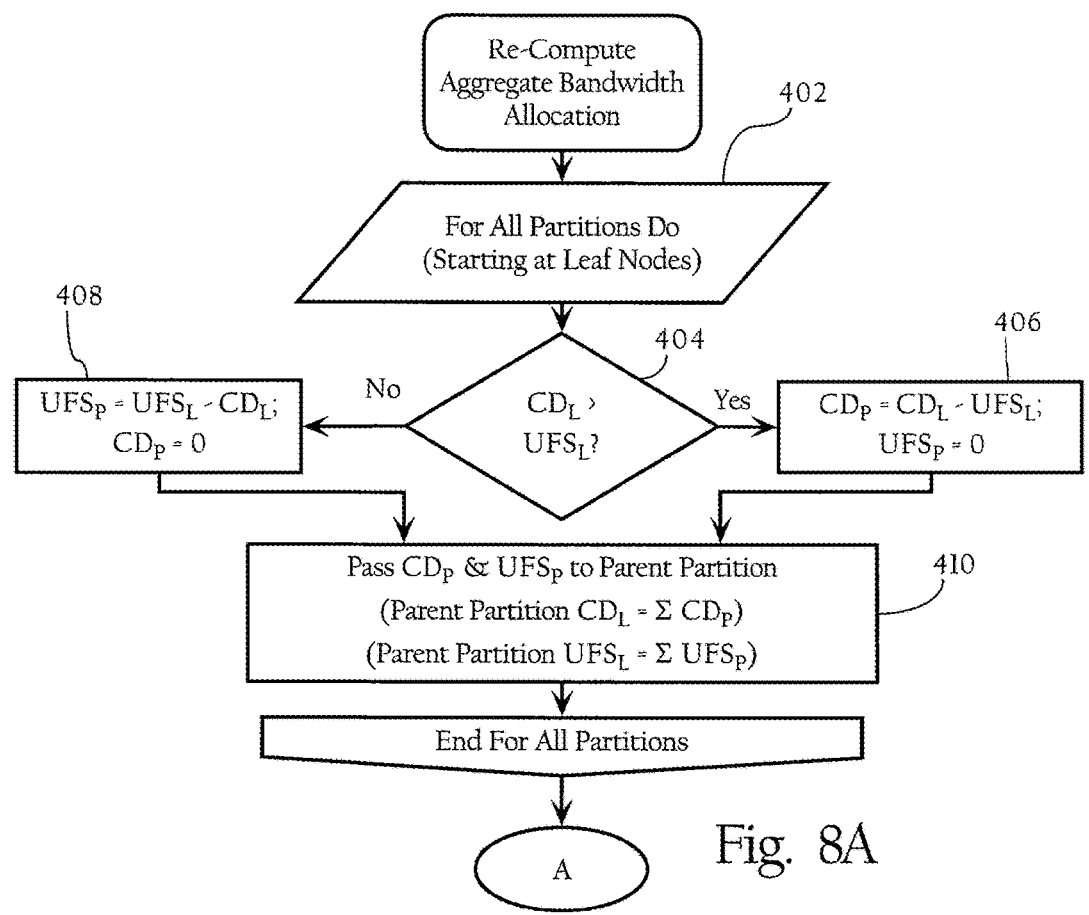
FIGS. 8A and 8B, together, are a flow chart diagram illustrating a method, according to one implementation of the present invention, directed to computing an aggregate bandwidth allocation among partitions.
Figure 8B:
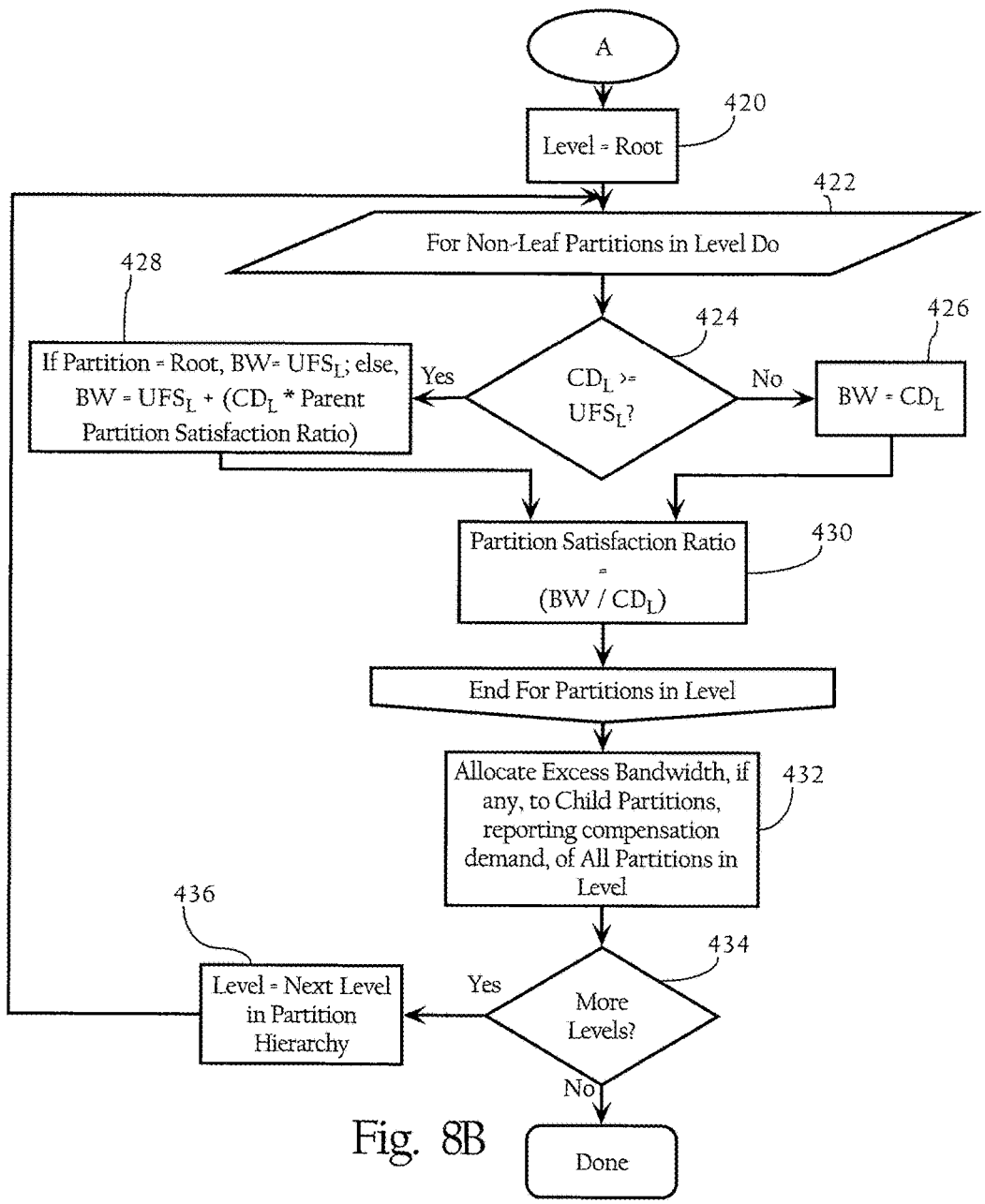

FIGS. 8A and 8B together illustrate a method, according to one implementation of the invention, directed to computing aggregate bandwidth allocations across partitions in response to observed compensation demand and bandwidth underutilization. In one implementation, flow control module 94 traverses the hierarchical partition configuration (402), starting at the leaf nodes, to compute the un-utilized fair share ($UFS_P$) and compensation demand ($CD_P$) for each partition node (402, 404, 406 and 408) that is sent up to the parent partition node. If the aggregate compensation demand ($CD_L$) is less than the aggregate unutilized fair share ($UFS_L$) (404), the unutilized fair share ($UFS_P$) passed up to the partition node is the difference between the aggregate unused fair share ($UFS_L$) across the flows in the partition less the aggregate compensation demand ($CD_L$) across the flows (408). As to non-leaf partitions, the unutilized fair share ($UFS_P$) sent to the parent partition is the aggregate unutilized fair share ($UFS_L$) across the child partitions less the aggregate compensation demand ($CD_L$) across the child partitions. Similarly, if the aggregate unused fair share ($UFS_L$) is less than the aggregate compensation demand ($CD_L$) (404), the compensation demand ($CD_P$) passed to the parent partition is the difference between the aggregate compensation demand ($CD_L$) and the aggregate unutilized fair share ($UFS_L$), across flows or child partitions (406). After computing ($CD_P$) and ($UFS_P$) for the partition, it is passed to the parent partition where a similar computation is made. As FIG. 8A illustrates, flow control module 94 traverses the partition configuration until the root node is reached.

Flow control module 94, in one implementation, then computes the excess bandwidth available for distribution. Flow control module 94, starting at the root level in the partition configuration hierarchy (420), computes the excess bandwidth allocation available for distribution to child partitions for all non-leaf partitions in that current level (422). As FIG. 8B illustrates, if the aggregate compensation demand ($CD_L$) is less than the aggregate unutilized fair share ($UFS_L$) (424), flow control module 94 sets the excess bandwidth allocation (BW) for the partition node to the aggregate compensation demand (426) and sets the partition satisfaction ratio to one, since the excess bandwidth allocation (BW) is equal to the compensation demand ($CD_L$) for the partition. Otherwise, if the aggregate compensation demand ($CD_L$) is greater than or equal to the aggregate unutilized fair share ($UFS_L$), flow control module 94 computes the excess bandwidth allocation (BW) based on the aggregate unutilized fair share ($UFS_L$) and the product of the aggregate compensation demand ($CD_L$) and the partition satisfaction ratio of the parent partition (428). Note that in the case of the root partition node, the excess bandwidth allocation (BW) is the aggregate unutilized fair share ($UFS_L$). As FIG. 8B further illustrates, flow control module 94 then computes the partition satisfaction ratio for the partition node (430). Flow control module 94 then allocates the computed excess bandwidth allocation (BW) to the child partition nodes that reported aggregate compensation demand ($CD_P$) greater than 0 (432). Flow control module then repeats this process for each level in the partition configuration hierarchy that includes a non-leaf node (434, 436).

The following provides a didactic example of the aggregate bandwidth allocation process described above. For didactic purposes, assume the partition configuration illustrated in FIG. 9A, and the aggregate rate demand illustrated in Table 3.

TABLE 3

| Partition | Demand |
|---|---|
| C | 300K |
| D | 200K |
| B | 400K |

Table 4 illustrates the aggregate compensation demand ($CD_P$) and the aggregate unutilized fair share ($UFS_P$) passed to the parent partitions.

TABLE 4

| Partition | Rate Demand | Fair share | ($UFS_P$) | ($CD_P$) |
|---|---|---|---|---|
| B | 400K | 600K | 200K | 0 |
| C | 300K | 80K | 0 | 220K |
| D | 200K | 320K | 120K | 0 |
| A | X | 400K | 0 | 100K |

At the root partition, flow control module 94, according to the example above, computes an excess bandwidth allocation (BW) of 100 Kbps, which ultimately gets allocated to partition C. Table 5 illustrates the resulting distribution of compensation bandwidth.

TABLE 5

| Partition | Demand | Fair share | Compensated bandwidth | Satisfaction ratio |
|---|---|---|---|---|
| A | 500K | 400K | 100K(from B via Root) | 100% |
| C | 300K | 80K | 120K(from D) + 100K(from A) | 100% |
| D | 200K | 320K | 0 | X |
| B | 400K | 600K | 0 | X |

As discussed above, if, during a subsequent adjustment interval, the rate demand observed at partition B increases to 550 Kbps, for example, the resulting distribution is illustrated in Table 6.

TABLE 6

| Partition | Demand | Fair share | Compensated bandwidth | Satisfaction ratio |
|---|---|---|---|---|
| A | 500K | 400K | 50K(from B via Root) | 50% |
| C | 300K | 80K | 120K(from D) + 50K(from A) | 77% |
| D | 200K | 320K | 0 | X |
| B | 550K | 600K | 0 | X |

As the foregoing illustrates, just as partitions not using their full share of bandwidth pass up their unutilized fair share to their parent partitions, partitions that are running over a threshold percentage of their fair share are allowed to express their ability to use more bandwidth as a compensation demand which is essentially a percentage of its current running rate. Other implementations are possible. For example, each partition can be allocated excess bandwidth according to the compensation demand algorithms set forth above for per-flow bandwidth allocations. Since the weight value of a partition is already factored into the allocation of target aggregate bandwidth allocation, the consequent compensation demand from a partition is a representation of its weight to its parent partition. For example, consider for didactic purposes a parent partition A that has 3 children: X with a weight 1, Y with a weight 5, and Z with a weight 4. Suppose Partition A has a bandwidth allocation of 1 Mbps;

the weighted allocations for the child partitions are 100 Kbps, 500 Kbps and 400 Kbps. Suppose also Z only uses 100 Kbps during a given cycle, leaving 300 k unused bandwidth at A. If both Partition X and Y are currently running over a threshold percentage of their current bandwidth allocation, running at 100 Kbps and 500 Kbps, respectively. If the percentage increase is 6 percent, partition X will receive 6 Kbps, while Partition Y receives 30 Kbps. As the foregoing illustrates, the respective compensation demands of Partition X and Y are in proportion to their weights.

While the foregoing scheme works for its intended objective, compensation demand in six percent increments may not be sufficient to address actual aggregate demand for a given partition. Accordingly, an alternative method involves child partitions sending a weighted demand to the parent partition. For example, assume the same general configuration discussed above, and that both partitions X and Y current aggregate bandwidth demands are approximately 1 Mbps. In this example, partition X would send a weighted rate demand of 1 Mbps (1 Mbps*1), while Partition Y would send a weighted rate demand of 5 Mbps (1 Mbps*5). By employing a satisfaction ratio at the parent partition (0.05=300 Kbps/(1 Mbps+5 Mbps) and the weights of the partitions, partition X would receive 50 Kbps (1 Mbps*0.05) of excess bandwidth, while partition Y would receive 250 Kbps. This scheme may also involve multiple compensation rounds. In addition, a simple variant of the above scheme can also be employed. For example, each parent partition may maintain a sum of the weights of the child partitions that transmit a compensation demand. In the above example, parent partition A would maintain a compensation weight sum of 6 (1+5). Partition A can then distribute excess bandwidth (300 Kbps, in this example) based on the ratio of each child partition's weight to the compensation weight sum.

Lastly, although the present invention has been described as operating in connection with end systems and networks employing the TCP, IP and Ethernet protocols, the present invention has application in computer network environments employing any suitable transport layer, network layer and link layer protocols. Moreover, while the present invention has been described as operating in connection with the partitioning mechanism disclosed in U.S. application Ser. No. 10/108,085, the present invention can be used in connection with any suitable partitioning mechanism. Still further, the present invention can be used in connection with dynamic partitions. A dynamic partition is a partition that is created on demand as needed for a particular traffic classification. Dynamic partitioning of network resources is disclosed in U.S. patent application Ser. No. 09/966,538 identified above and incorporated by reference herein. Each dynamically created partition is assigned the same weight and thus gets a fair share aggregate bandwidth allocation. Accordingly, the present invention has been described with reference to specific embodiments. Other embodiments of the present invention will be apparent to one of ordinary skill in the art. It is, therefore, intended that the claims set forth below not be limited to the embodiments described above.

What is claimed is:

1. A method comprising:
   allocating network bandwidth to a plurality of partitions arranged in a hierarchical configuration, wherein each partition in the plurality of partitions is associated with a respective weighting value and a respective aggregate bandwidth allocation based on a weighted fair share allocation scheme;
   receiving packets;
   associating the packets with corresponding data flows, each such data flow associated with packets originating from a common source and targeting a common destination;
   associating the data flows with corresponding partitions of the plurality of partitions;
   enforcing the aggregate bandwidth allocations of the partitions on the associated data flows;
   monitoring bandwidth demand of each partition in the plurality of partitions relative to the weighted fair share bandwidth allocation scheme;
   adding packets to a high priority queue within a first partition based on a determination that a measured data rate for the first partition is less than a fair share bandwidth allocation for the first partition, the first partition including the high priority queue and a low priority queue;
   adding packets to a low priority queue within the first partition based on a determination that a measured data rate for the first partition is not less than a fair share bandwidth allocation for the first partition, the first partition including a high priority queue and the low priority queue; and
   dynamically allocating unutilized bandwidth to partitions of the plurality of partitions with a bandwidth demand that exceeds the respective aggregate bandwidth allocation, wherein the unutilized bandwidth is allocated based on the weighting values associated with the partitions.

2. The method of claim 1 wherein the monitoring step comprises monitoring the rate at which packets are received.

3. The method of claim 1 wherein the monitoring step comprises monitoring the number of packets buffered in a partition queue at periodic intervals.

4. The method of claim 1 further comprising
   determining per-flow target rates for the data flows.

5. The method of claim 4 wherein the per-flow target rates, for each data flow, are based, at least in part on, the aggregate bandwidth allocation of the partition associated with a data flow and the number of active data flows associated with the partition.

6. The method of claim 1 wherein the unutilized bandwidth is allocated based on the weighting values and the minimum bandwidth allocations associated with the partitions.

7. The method of claim 1 wherein at least one partition includes a maximum bandwidth setting; and wherein the unutilized bandwidth is allocated based on the weighting values and one or more minimum bandwidth settings associated with the partitions.

8. A method for achieving a weight-based aggregate bandwidth allocation scheme, comprising
   receiving a hierarchical partition configuration comprising a root partition node at a first level of the hierarchical partition configuration, and a plurality of child partition nodes at least a second level of the hierarchical partition configuration; wherein the root partition node represents available bandwidth; and wherein the child partition nodes include a weighting value;
   adding packets to a high priority queue within a first partition based on a determination that a measured data rate for the first partition is less than a fair share bandwidth allocation for the first partition, the first partition including the high priority queue and a low priority queue;

adding packets to a low priority queue within the first partition based on a determination that a measured data rate for the first partition is not less than a fair share bandwidth allocation for the first partition, the first partition including a high priority queue and the low priority queue;

allocating bandwidth from the root partition node to the child partition nodes based on the corresponding weighting values of the child partition nodes and the minimum bandwidth allocations corresponding to the at least a first child partition node;

dynamically adjusting bandwidth allocations on a per-flow basis between one or more flows within the child partition nodes, each such data flow associated with packets originating from a common source and targeting a common destination; and dynamically allocating bandwidth on a per-flow basis between the one or more flows within the child partition nodes.

9. The method of claim 8 wherein the hierarchical partition configuration further comprises a third level, the third level of the partition configuration hierarchy comprising at least one child partition node, the method further comprising allocating bandwidth from a child partition node in the second level to all child partition nodes in the third level of the child partition node in the second level based on the corresponding weighting value associated with each of the child partition nodes in the third level, the child partition nodes in the third level associated with at least two or more different weighting values.

* * * * *